(12) United States Patent
Koshika et al.

(10) Patent No.: US 12,381,212 B2
(45) Date of Patent: Aug. 5, 2025

(54) METHOD FOR PRODUCING POSITIVE ELECTRODE ACTIVE MATERIAL FOR LITHIUM ION SECONDARY BATTERY

(71) Applicant: SUMITOMO METAL MINING CO., LTD., Tokyo (JP)

(72) Inventors: Yuki Koshika, Niihama (JP); Haruki Kaneda, Niihama (JP); Yukihiro Goda, Niihama (JP)

(73) Assignees: SUMITOMO METAL MINING CO., LTD., Tokyo (JP); PANASONIC ENERGY CO., LTD., Osaka (JP)

( * ) Notice: Subject to any disclaimer, the term of this patent is extended or adjusted under 35 U.S.C. 154(b) by 513 days.

(21) Appl. No.: 17/625,863

(22) PCT Filed: Jun. 30, 2020

(86) PCT No.: PCT/JP2020/025730
§ 371 (c)(1),
(2) Date: Jul. 14, 2022

(87) PCT Pub. No.: WO2021/006127
PCT Pub. Date: Jan. 14, 2021

(65) Prior Publication Data
US 2023/0187625 A1 Jun. 15, 2023

(30) Foreign Application Priority Data

| Jul. 8, 2019 | (JP) | 2019-127258 |
| Jul. 8, 2019 | (JP) | 2019-127259 |
| Dec. 26, 2019 | (JP) | 2019-236895 |
| Dec. 26, 2019 | (JP) | 2019-236896 |
| May 27, 2020 | (JP) | 2020-092692 |
| May 27, 2020 | (JP) | 2020-092693 |

(51) Int. Cl.
*H01M 4/505* (2010.01)
*C01G 53/44* (2025.01)
*H01M 4/525* (2010.01)

(52) U.S. Cl.
CPC .......... *H01M 4/505* (2013.01); *C01G 53/44* (2013.01); *H01M 4/525* (2013.01); *C01P 2002/52* (2013.01); *C01P 2002/85* (2013.01); *C01P 2004/04* (2013.01); *C01P 2004/50* (2013.01); *C01P 2004/84* (2013.01); *C01P 2006/40* (2013.01)

(58) Field of Classification Search
None
See application file for complete search history.

(56) References Cited

U.S. PATENT DOCUMENTS

| 2012/0135315 A1 | 5/2012 | Niina et al. |
| 2013/0189581 A1 | 7/2013 | Imaizumi et al. |
| 2016/0293952 A1* | 10/2016 | Kaneda ............... H01M 4/505 |
| 2018/0048015 A1* | 2/2018 | Lee ................... H01M 10/058 |
| 2018/0233739 A1 | 8/2018 | Park et al. |
| 2019/0393484 A1 | 12/2019 | Fujihara |
| 2020/0251733 A1 | 8/2020 | Takano et al. |
| 2020/0388841 A1* | 12/2020 | Kaneda ............... H01M 4/525 |
| 2021/0280864 A1 | 9/2021 | Kaneda et al. |
| 2022/0149351 A1 | 5/2022 | Fujihara |

FOREIGN PATENT DOCUMENTS

| CN | 109638232 A | 4/2019 | |
| JP | 2002-151071 A | 5/2002 | |
| JP | 2003-308880 A | 10/2003 | |
| JP | 2006-147499 A | 6/2006 | |
| JP | 2007-265784 A | 10/2007 | |
| JP | 2008-017729 A | 1/2008 | |
| JP | 2008-117729 A | 5/2008 | |
| JP | 2008-153017 A | 7/2008 | |
| JP | 2008-257902 A | 10/2008 | |
| JP | 4807467 B1 | 11/2011 | |
| JP | 2015-099793 A | 5/2015 | |
| JP | 2018-534735 A | 11/2018 | |
| JP | 2019-102439 A | 6/2019 | |
| JP | 2020-004537 A | 1/2020 | |
| WO | 2011/016553 A1 | 2/2011 | |
| WO | 2018/043669 A1 | 3/2018 | |
| WO | WO-2018123951 A1 * | 7/2018 | ............. C01G 33/00 |
| WO | 2019/131779 A1 | 7/2019 | |

OTHER PUBLICATIONS

Kaneda et al. Improving the Cycling Performance and Thermal Stability of LiNi0.6Co0.2Mn0.2O2 Cathode Materials by Nb-doping and Surface Modification. Int. J. Electrochem Sci, 12, 2017, 4640-4653 (Year: 2017).*

Extended (Supplementary) European Search Report dated Jul. 6, 2023, issued in counterpart EP Application No. 20836841.5. (6 pages).

International Search Report dated Aug. 11, 2020, issued in counterpart International application No. PCT/JP2020/025730, with English translation. (4 pages).

(Continued)

*Primary Examiner* — Tanisha Diggs
(74) *Attorney, Agent, or Firm* — WHDA, LLP

(57) ABSTRACT

The method for producing a positive electrode active material for a lithium ion secondary battery includes preparing a mixture containing at least a nickel-manganese composite compound, a lithium compound, and optionally one or both of a titanium compound and a niobium compound. The method also includes firing the mixture from 750° C. to 1000° C. so as to obtain the lithium-nickel-manganese composite oxide, in which the nickel-manganese composite compound contains at least nickel, manganese, and an element M, an amount of substance ratio (z) of titanium and an amount of substance ratio (w) of niobium to a total amount of substance of nickel, manganese, the element M, titanium, and niobium in the mixture satisfy $0.005 \le z \le 0.05$, $0.001 < w \le 0.03$, $(z+w) \le 0.06$, and $z > w$, and at least a part of the niobium is segregated to a grain boundary between primary particles.

17 Claims, 18 Drawing Sheets

(56) References Cited

OTHER PUBLICATIONS

International Preliminary Report on Patentability (Form PCT/IB/373) issued in counterpart International application No. PCT/JP2020/025730 mailed Jan. 11, 2022 with Form PCT/ISA/237, with English translation. (10 pages).
Office Action dated Aug. 20, 2024, issued in counterpart JP Application No. 2021-530632, with English translation. (10 pages).

* cited by examiner

|  | INTRAPARTICLE |
|---|---|
|  | ATOMIC% |
| Nb | 0.43 |
| Ti | 2.5 |
| Mn | 10.08 |
| Co | 5.53 |
| Ni | 81.47 |

|  | INTRAPARTICLE |
|---|---|
|  | ATOMIC% |
| Nb | 0.46 |
| Ti | 2.6 |
| Mn | 10.0 |
| Co | 5.4 |
| Ni | 81.6 |

|  | GRAIN BOUNDARY |
|---|---|
|  | ATOMIC% |
| Nb | 0.8 |
| Ti | 2.28 |
| Mn | 9.43 |
| Co | 5.31 |
| Ni | 82.18 |

|  | GRAIN BOUNDARY |
|---|---|
|  | ATOMIC% |
| Nb | 0.79 |
| Ti | 2.1 |
| Mn | 9.7 |
| Co | 5.4 |
| Ni | 82.0 |

//  # METHOD FOR PRODUCING POSITIVE ELECTRODE ACTIVE MATERIAL FOR LITHIUM ION SECONDARY BATTERY

TECHNICAL FIELD

The present invention relates to a method for producing a positive electrode active material for a lithium ion secondary battery.

BACKGROUND ART

In recent years, with widespread use of a portable electronic device such as a mobile phone terminal or a notebook personal computer, development of a small and lightweight non-aqueous electrolyte secondary battery having a high energy density and durability has been strongly desired. Furthermore, development of high-output secondary batteries as batteries for electric tools and electric cars including hybrid cars has been strongly desired.

As a secondary battery satisfying such requirement, there is a non-aqueous electrolyte secondary battery such as a lithium ion secondary battery. A lithium ion secondary battery using a lithium-metal composite oxide having a layered or spinel type crystal structure as a positive electrode active material can obtain a high voltage of 4 V-class and therefore has been put into practical use as a battery having a high energy density.

As the lithium-metal composite oxide, lithium-cobalt composite oxide ($LiCoO_2$) that is relatively easily synthesized, lithium-nickel composite oxide ($LiNiO_2$) using nickel that is cheaper than cobalt, lithium-nickel-cobalt-manganese composite oxide ($LiNi_{1/3}Co_{1/3}Mn_{1/3}O_2$), lithium-manganese composite oxide ($LiMn_2O_4$) using manganese, lithium-nickel-manganese composite oxide ($LiNi_{0.5}Mn_{0.5}O_2$), and the like have been proposed.

However, when a non-aqueous electrolyte is used as a battery material of a lithium ion secondary battery, high thermal stability is required. For example, when short circuit occurs inside a lithium ion secondary battery, heat is generated by a rapid current, and therefore higher thermal stability is required.

In this regard, lithium-nickel-cobalt-manganese composite oxide, lithium-nickel-manganese composite oxide, or the like that is excellent in thermal stability has recently attracted attention. The lithium-nickel-cobalt-manganese composite oxide is a layered compound as lithium-cobalt composite oxide, lithium-nickel composite oxide, and the like and refers to a ternary system positive electrode active material in which a composition ratio of nickel, cobalt, and manganese at the transition metal site is 1:1:1.

Particularly, in recent years, aiming at capacity enlargement, a ternary system positive electrode active material or a positive electrode active material (Hi-Ni positive electrode material) obtained by increasing a nickel ratio of a lithium-nickel-manganese composite oxide to have a high nickel ratio has attracted attention. However, since an increase in battery capacity depending on the nickel ratio causes a trade-off with a decrease in thermal stability, a positive electrode active material with high performances as a lithium ion secondary battery (such as high cycle characteristics, a high capacity, and a high output), short circuit resistance, and thermal stability achieved at the same time is required.

There have been proposed some techniques of adding niobium to a lithium-metal composite oxide in order to improve thermal stability. For example, in Patent Literature 1, there has been proposed a positive electrode active material for a non-aqueous secondary battery, which is formed of a composition containing at least one or more compounds that are represented by a general formula: $Li_aNi_{1-x-y-z}Co_xM_yNb_zO_b$ (where M is one or more elements selected from the group consisting of Mn, Fe and Al, $1 \le a \le 1.1$, $0.1 \le x \le 0.3$, $0 \le y \le 0.1$, $0.01 \le z \le 0.05$, and $2 \le b \le 2.2$) and composed of lithium, nickel, cobalt, an element M, niobium, and oxygen. According to Patent Literature 1, a positive electrode active material having high thermal stability and a large discharge capacity is supposed to be obtained since a Li—Nb—O-based compound existing in the vicinity of surfaces of particles or inside the particles has high thermal stability.

Furthermore, in Patent Literature 2, there has been proposed a positive electrode active material for a non-aqueous electrolyte secondary battery, which contains lithium-nickel-manganese composite oxide that is represented by a general formula (1): $Li_aNi_{1-a-b-c}Mn_aM_bNb_cO_{2+\gamma}$ (in General formula (1) above, M is at least one element selected from the group consisting of Co, W, Mo, V, Mg, Ca, Al, Ti, Cr, Zr and Ta, $0.05 \le a \le 0.60$, $0 \le b \le 0.60$, $0.0003 \le c \le 0.03$, $0.95 \le d \le 1.20$, and $0 \le \gamma \le 0.5$), in which at least a part of niobium in the lithium-nickel-manganese composite oxide is solid-solved in the primary particles.

According to Patent Literature 2, a non-aqueous secondary battery is supposed to be obtained in which both of a high energy density and excellent output characteristics and thermal stability during short circuit attributable to a decrease in conductivity are achieved in a higher level.

CITATION LIST

Patent Literature

Patent Literature 1: JP 2002-151071 A
Patent Literature 2: WO 2018/043669 A
Patent Literature 3: JP 2008-017729 A
Patent Literature 4: JP 4807467 B1
Patent Literature 5: JP 2006-147499 A
Patent Literature 6: JP 2007-265784 A
Patent Literature 7: JP 2008-257902 A

SUMMARY OF INVENTION

Technical Problem

It is described that the positive electrode active materials described in Patent Literatures 1 and 2 above contain niobium in a specific form so as to improve thermal stability, but a further improvement in thermal stability in lithium-nickel-manganese composite oxide having a high nickel ratio is required. Furthermore, since niobium is expensive, a method for producing a positive electrode active material capable of achieving high thermal stability at lower cost is required.

The present invention has been achieved in view of these circumstances. An object of the present invention is to provide a method capable of easily producing a positive electrode active material containing lithium-nickel-manganese composite oxide having a high nickel ratio in industrial scale production, the positive electrode active material that can achieve higher thermal stability at low cost.

There have been proposed some techniques of adding, for example, titanium to lithium-metal composite oxide in order to obtain a positive electrode active material having high battery characteristics. According to Patent Literatures 3 to 7, a positive electrode active material formed of lithium-nickel-cobalt-titanium composite oxide has favorable thermal stability and a high battery capacity.

Furthermore, when short circuit occurs inside the lithium ion secondary battery, as one of methods of suppressing a rapid increase in current caused by short circuit, for example, as described in Patent Literature 2 above, it is conceivable that decreasing conductivity of the positive electrode active material in a state of existing while compressed to the positive electrode or increasing the volume resistivity is effective.

However, in Patent Literatures 1 to 7 above, there is no description of an effect obtained by containing a combination of niobium and titanium as heterogeneous elements in lithium-nickel-manganese composite oxide, and in Patent Literatures 1 and 3 to 7, there is also no description of the electroconductivity of the positive electrode active material in a state of being compressed to the positive electrode or a volume resistivity thereof.

Solution to Problem

According to a first aspect of the present invention, there is provided a method for producing a positive electrode active material for a lithium ion secondary battery which contains a lithium-nickel-manganese composite oxide having a hexagonal layered structure and configured by secondary particles with a plurality of aggregated primary particles, the method including: a mixture preparation process of preparing a mixture containing at least a nickel-manganese composite compound, a lithium compound, and optionally one or both of a titanium compound and a niobium compound; and a firing process of firing the mixture at 750° C. or higher and 1000° C. or lower so as to obtain the lithium-nickel-manganese composite oxide, in which the nickel-manganese composite compound contains nickel (Ni), manganese (Mn), optionally an element M (M) that is at least one element selected from the group consisting of Co, V, Mg, Mo, Ca, Cr, Ta, Na, W, Fe, Zn, B, Si, P, Zr, and Al, titanium (Ti), and niobium (Nb), and an amount of substance ratio of the respective elements is represented as Ni:Mn:M:Ti:Nb=$(1-x-y):x:y:z':w'$ (provided that, $0.03 \le x \le 0.30$, $0 \le y \le 0.30$, $0 \le z' \le 0.05$, and $0 \le w' \le 0.03$), an amount of substance ratio (z) of titanium and an amount of substance ratio (w) of niobium to a total amount of substance of nickel, manganese, the element M, titanium, and niobium in the mixture satisfy $0.005 \le z \le 0.05$, $0.001 < w \le 0.03$, $(z+w) \le 0.06$, and $z > w$, and at least a part of the niobium in the lithium-nickel-manganese composite oxide is segregated to a grain boundary between primary particles.

According to a second aspect of the present invention, there is provided a method for producing a positive electrode active material for a lithium ion secondary battery which contains a lithium-nickel-manganese composite oxide having a hexagonal layered structure and configured by secondary particles with a plurality of aggregated primary particles, the method including: a mixture preparation process of preparing a mixture by mixing at least a nickel-manganese composite compound, a titanium compound, a niobium compound, and a lithium compound; and a firing process of firing the mixture at 750° C. or higher and 1000° C. or lower so as to obtain the lithium-nickel-manganese composite oxide, wherein the nickel-manganese composite compound contains nickel (Ni), manganese (Mn), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements is represented as Ni:Mn:M=$(1-x-y):x:y$ (provided that, $0.03 \le x \le 0.30$ and $0 \le y \le 0.30$), an amount of substance ratio (z) of titanium and an amount of substance ratio (w) of niobium to a total amount of substance of nickel, manganese, the element M, titanium, and niobium in the mixture satisfy $0.005 \le z \le 0.05$, $0.001 < w \le 0.03$, $(z+w) \le 0.06$, and $z > w$, and at least a part of the niobium in the lithium-nickel-manganese composite oxide is segregated to a grain boundary between primary particles.

Furthermore, in the first aspect or the second aspect, the production method may include a water-washing process of mixing and stirring water at a ratio of 50 parts by weight or more and 200 parts by weight or less with respect to 150 parts by weight of the lithium-nickel-manganese composite oxide obtained after firing and then performing solid-liquid separation; and a drying process of drying the lithium-nickel-manganese composite oxide obtained after water-washing. Furthermore, the amount of substance ratio (z) of titanium and the amount of substance ratio (w) of niobium to a total amount of substance of nickel, manganese, the element M, titanium, and niobium in the mixture may satisfy $0.005 \le z \le 0.05$, $0.002 \le w \le 0.03$, $(z+w) \le 0.06$, and $z > w$.

Furthermore, in the mixture preparation process, at least a nickel-manganese composite compound containing titanium, a niobium compound, and a lithium compound may be mixed, the nickel-manganese composite compound may contain nickel (Ni), manganese (Mn), titanium (Ti), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements may be represented as Ni:Mn:M:Ti=$(1-x-y-z'):x:y:z'$ (provided that, $0.03 \le x \le 0.30$, $0 \le y \le 0.30$, and $0.005 \le z' \le 0.05$).

Furthermore, the nickel-manganese composite compound containing titanium may be obtained by crystallization. Furthermore, the nickel-manganese composite compound containing titanium may be obtained by coating the nickel-manganese composite compound to be obtained by crystallization with a compound containing titanium.

Furthermore, in the mixture preparation process, at least a nickel-manganese composite compound containing niobium, a lithium compound, and a titanium compound may be mixed, the nickel-manganese composite compound containing niobium may contain nickel (Ni), manganese (Mn), niobium (Nb), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements may be represented as Ni:Mn:M:Nb=$(1-x-y):x:y:w'$ (provided that, $0.03 \le x \le 0.30$, $0 \le y \le 0.30$, and $0.001 < w' \le 0.03$).

Furthermore, the nickel-manganese composite compound containing niobium may be obtained by coating the nickel-manganese composite compound to be obtained by crystallization with a compound containing niobium. Furthermore, an amount of substance ratio of the elements in the nickel-manganese composite compound containing niobium may be represented as Ni:Mn:M:Nb=$(1-x-y):x:y:w'$ (provided that, $0.03 \le x \le 0.30$, $0 \le y \le 0.30$, and $0.002 \le w' \le 0.03$).

Furthermore, it is preferable that the firing process is performed in an atmosphere having an oxygen concentration of 80 vol % or more and 100 vol % or less. Furthermore, titanium in the lithium-nickel-manganese composite oxide may exist inside the primary particles. Furthermore, it is preferable that the titanium compound is titanium oxide. Furthermore, it is preferable that the niobium compound is niobium oxide, niobic acid, or a mixture thereof. Furthermore, it is preferable that a volume resistivity, as determined by powder resistivity measurement, when the lithium-nickel-manganese composite oxide obtained after firing is compressed to 4.0 g/cm$^3$ is preferably 5.0×10$^2$ Ω·cm or more and 1.0×10$^5$ Ω·cm or less.

Advantageous Effects of Invention

According to the present invention, it is possible to provide a method for producing a positive electrode active material that can achieve extremely high thermal stability at low cost is provided. Furthermore, the present invention can easily produce such a positive electrode active material in industrial scale production, and is considered to be extremely industrially valuable.

DESCRIPTION OF EMBODIMENTS

Hereinafter, first, a positive electrode active material for a lithium ion secondary battery obtained by a production method according to the present embodiment will be described, and then a method for producing a positive electrode active material for a lithium ion secondary battery according to the present embodiment and a lithium ion secondary battery using this positive electrode active material will be described.

1. Positive Electrode Active Material for Lithium Ion Secondary Battery

It is preferable that a positive electrode active material for a lithium ion secondary battery (hereinafter, also referred to as "positive electrode active material") according to the present embodiment contains a lithium-nickel-manganese composite oxide having a hexagonal layered structure and configured by secondary particles with a plurality of aggregated primary particles. The lithium-nickel-manganese composite oxide contains lithium (Li), nickel (Ni), manganese (Mn), titanium (Ti), niobium (Nb), and optionally an element M (M) that is at least one element selected from the group consisting of Co, V, Mg, Mo, Ca, Cr, Ta, Na, W, Fe, Zn, B, Si, P, Zr, and Al, as elements other than oxygen.

Particularly, when a combustible non-aqueous electrolyte is used as a constituent material of the lithium ion secondary battery, the lithium ion secondary battery is required to have high thermal stability. Furthermore, in a lithium ion secondary battery, when short circuit occurs between a positive electrode and a negative electrode in a charged state, a current rapidly flows to generate large heat. As a result, a chain may occur in which a positive electrode active material is decomposed to further generate heat. Therefore, by using a positive electrode active material having a high volume resistivity under a compressed condition in the positive electrode, it is possible to suppress a rapid increase in current caused by short circuit and to further improve thermal stability during short circuit.

The present inventors have conducted intensive studies, and as a result, have found that by containing specific amounts of titanium (Ti) and niobium (Nb) in a specific distribution in lithium-nickel-manganese composite oxide to be used in a positive electrode active material, the positive electrode active material has an extremely high volume resistivity and high thermal stability can be realized by suppressing oxygen releasing at the time of overcharge, thereby completing the present invention.

Hereinafter, an effect obtained by containing titanium (Ti) and niobium (Nb) in the lithium-nickel-manganese composite oxide according to the present embodiment will be described with reference to FIGS. 1 to 5. Note that, FIGS. 1 to 5 are made based on evaluation results of positive electrode active materials and secondary batteries obtained in Examples and Comparative Examples to be described below.

Figure 1:
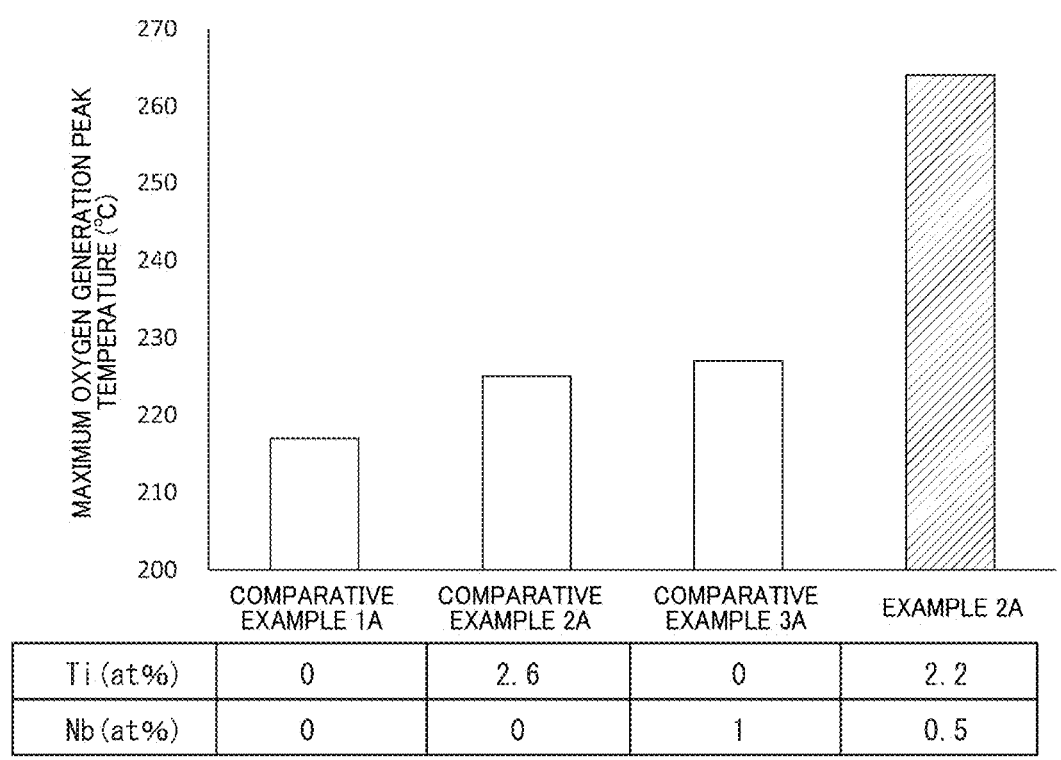
FIG. 1 is a graph showing maximum oxygen generation peak temperatures of positive electrode active materials obtained in Comparative Examples 1A, 2A, and 3A and Example 2A.

FIG. 1 is a graph showing maximum oxygen generation peak temperatures (° C.) obtained by measuring the amount of oxygen when lithium-nickel-manganese composite oxide (positive electrode active material) in an overcharged state is heated from room temperature to 450° C.

The graph of FIG. 1 shows maximum oxygen generation peak temperatures of Comparative Example 1A not containing titanium and niobium, Comparative Example 2A containing titanium alone (Ti: 2.6 atomic %), Comparative Example 3 containing niobium alone (Nb: 1 atomic %), and Example 2 containing titanium and niobium (Ti: 2.2 atomic %, Nb: 0.5 atomic %), from the left.

As shown in FIG. 1, as compared with Comparative Example 1A not containing titanium and niobium, the maximum oxygen generation peak temperatures of Comparative Example 2A only containing titanium (Ti: 2.6 atomic %) and Comparative Example 3 only containing niobium (Nb: 1 atomic %) are increased. Furthermore, as compared with Comparative Examples 2A and 3A, the maximum oxygen generation peak temperature of Example 2A containing both of titanium and niobium (Ti: 2.2 atomic %, Nb: 0.5 atomic %) is further increased.

Furthermore, Example 2A contains only 0.5 atomic % of Nb along with Ti and shows a higher maximum oxygen generation peak temperature than Comparative Example 3A (Nb: 1 atomic %). Therefore, in the positive electrode active material according to the present embodiment, the amount of expensive niobium used can be decreased while oxygen generation at the time of overcharge is suppressed at a higher level.

Figure 2:
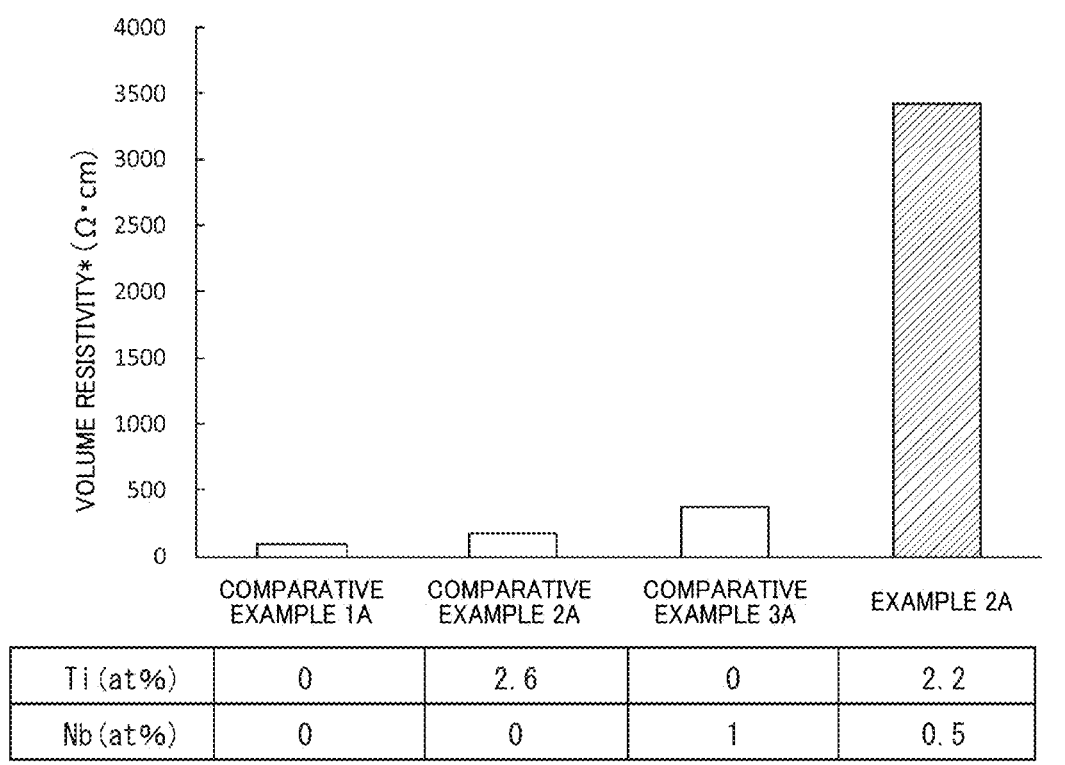
FIG. 2 is a graph showing volume resistivities of positive electrode active materials obtained in Comparative Examples 1A, 2A, and 3A and Example 2A when compressed.

FIG. 2 is a graph showing a volume resistivity (Ω·cm) when lithium-nickel-manganese composite oxide (positive electrode active material) is compressed to 4.0 g/cm$^3$.

As shown in FIG. 2, as compared with Comparative Example 1A not containing titanium and niobium, the volume resistivities of Comparative Example 2A only containing titanium (Ti: 2.6 atomic %) and Comparative Example 3A only containing niobium (Nb: 1 atomic %) are increased to some extent. However, as compared with Comparative Examples 2A and 3A, in Example 2A containing both of titanium and niobium (Ti: 2.2 atomic %, Nb: 0.5 atomic %), it is clear that the volume resistivity is extremely increased. Therefore, in the positive electrode active material according to the present embodiment, by containing titanium and niobium, the volume resistivity at the time of compression is significantly increased, and thus thermal stability during short circuit is excellent.

Figure 3:
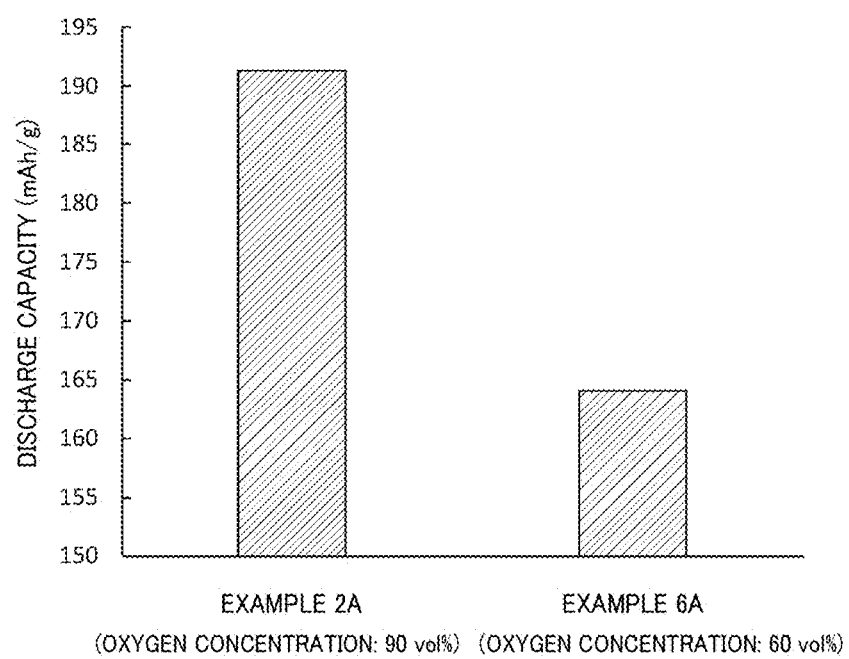
FIG. 3 is a graph showing discharge capacities of positive electrode active materials obtained in Examples 2A and 6A.

Furthermore, FIG. 3 is a graph showing discharge capacities (mAh/g) of Example 2A and Example 6A (Ti: 2.2 atomic %, Nb: 0.5 atomic %) produced under the same conditions, except that the oxygen concentration in an atmosphere in the firing process is changed. As shown in FIG. 3, in Example 2A in which the oxygen concentration when firing was set to 80 vol % or more (oxygen concentration: 90 vol %), the discharge capacity is improved as compared with Example 6A in which the oxygen concentration when firing was set to 60 vol %.

Thus, generally, although it is considered that it is difficult to achieve both a high volume resistivity and a high battery capacity, the positive electrode active material according to the present embodiment can attain a high battery capacity and achieve both high thermal stability and a high battery capacity at low cost by adjusting production conditions (for example, an oxygen concentration at the time of the firing process, and the like) regardless of an extremely high volume resistivity (when compressed to 4.0 g/cm$^3$).

From the above description, it is clear that in the positive electrode active material according to the present embodiment, (i) high thermal stability at the time of overcharge and an extremely high volume resistivity at the time of compression can be realized at low cost and thermal stability during short circuit is excellent by containing a combination of titanium and niobium in lithium-nickel-manganese composite oxide, and (ii) both of a high battery capacity and high thermal stability can be achieved by adjusting production conditions.

The present inventors have further conducted intensive studies, and as a result, have found that in lithium-nickel-manganese composite oxide to be used in a positive electrode active material, iii) high thermal stability can be attained and a battery capacity can be further improved by water-washing and drying the lithium-nickel-manganese composite oxide.

Hereinafter, an effect obtained by performing water washing and drying in the lithium-nickel-manganese composite oxide according to the present embodiment will be described with reference to FIGS. 4 and 5.

Figure 4:
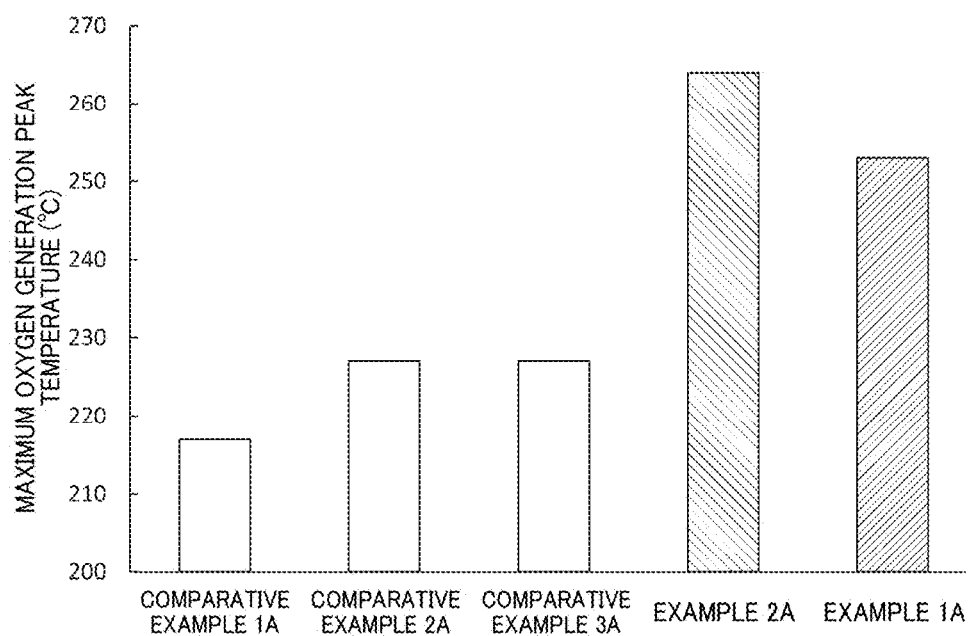
FIG. 4 is a graph showing maximum oxygen generation peak temperatures of positive electrode active materials obtained in Comparative Examples 1A, 2A, and 3A, Example 2A, and Example 11A.

FIG. 4 is a graph showing maximum oxygen generation peak temperatures (° C.) obtained by measuring the amount of oxygen when lithium-nickel-manganese composite oxide (positive electrode active material) in an overcharged state is heated from room temperature to 450° C.

The graph of FIG. 4 shows maximum oxygen generation peak temperatures of Comparative Example 1A not containing titanium and niobium. Comparative Example 2A containing titanium alone (Ti: 2.6 atomic %), Comparative Example 3A containing niobium alone (Nb: 1 atomic %), Example 2A containing titanium and niobium (Ti: 2.2 atomic %, Nb: 0.5 atomic %), and Example 11A obtained by water-washing and drying Example 2A (Ti: 2.2 atomic %, Nb: 0.5 atomic %), from the left.

As shown in FIG. 4, as compared with Comparative Example 1A not containing titanium and niobium, the maximum oxygen generation peak temperatures of Comparative Example 2A only containing titanium (Ti: 2.6 atomic %) and Comparative Example 3 only containing niobium (Nb: 1 atomic %) are increased. Furthermore, in Example 2A and Example 11A containing both of titanium and niobium (Ti: 2.2 atomic %, Nb: 0.5 atomic %), as compared with Comparative Example 2A, the maximum oxygen generation peak temperature is rised, and the maximum oxygen generation peak temperature that is the same degree as or more than that of Comparative Example 3A is shown.

Furthermore, Example 11A and Example 2A contain only 0.5 atomic % of Nb along with Ti and show higher maximum heat generation peak temperatures than Comparative Example 2A (Ti: 2.6 atomic %) and Comparative Example 3A (Nb: 1 atomic %). Therefore, in the positive electrode active material according to the present embodiment, it is clear that the amount of expensive niobium used can be decreased while oxygen generation at the time of overcharge is suppressed at a higher level.

Figure 5:
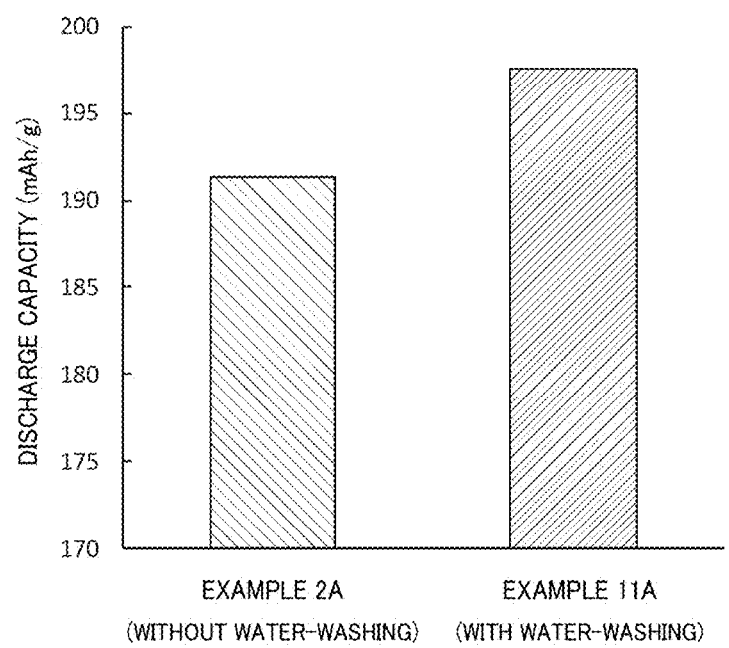
FIG. 5 is a graph showing discharge capacities of positive electrode active materials obtained in Examples 2A and Example 11A.

FIG. 5 is a graph showing battery capacities (initial discharge capacities) of Example 2A containing titanium and niobium (Ti: 2.2 atomic %, Nb: 0.5 atomic %) and Example 11 obtained by water-washing and drying Example 2A. As shown in FIG. 5, as compared with Example 2A in which water-washing was not performed, in Example 11A in which water-washing was performed, a battery capacity is improved.

Thus, since the lithium-nickel-manganese composite oxide contains titanium and niobium as heterogeneous elements, a battery capacity may be slightly decreased. However, the positive electrode active material according to the present embodiment can achieve both of high thermal stability and a higher battery capacity by performing water-washing and drying after firing as described below. Hereinafter, a preferred configuration of the positive electrode active material according to the present embodiment will be described in detail.

[Lithium-Nickel-Manganese Composite Oxide]

The lithium-nickel-manganese composite oxide contained in the positive electrode active material is configured by secondary particles with a plurality of aggregated primary particles. Furthermore, it is preferable that the lithium-nickel-manganese composite oxide has a hexagonal layered structure.

The lithium-nickel-manganese composite oxide contains lithium (Li), nickel (Ni), manganese (Mn), titanium (Ti), niobium (Nb), and optionally an element M (M) that is at least one element selected from the group consisting of Co, V, Mg, Mo, Ca, Cr, Ta, Na, W, Fe, Zn, B, Si, P, Zr, and Al, as elements other than oxygen.

The amount of substance ratio (molar ratio) of the above-described elements contained in the lithium-nickel-manganese composite oxide is not particularly limited, and from the viewpoint of a high battery capacity, the amount of substance ratio is preferably represented as Li:Ni:Mn:M:Ti:Nb=a:(1−x−y−z−w):x:y:z:w (provided that, $0.97 \leq a \leq 1.25$, $0.03 \leq x \leq 0.30$, $0 \leq y \leq 0.30$, $0.005 \leq z \leq 0.05$, and $0.001 < w \leq 0.03$). Furthermore, in the above-described amount of substance ratio, "z" indicating the amount of substance ratio of titanium (Ti) and "w" indicating the amount of substance ratio of niobium (Nb) satisfy relations of $(z+w) \leq 0.06$ and $z > w$. Hereinafter, preferred compositions of the respective elements will be described.

(Lithium)

In the above-described amount of substance ratio, since the total amount of substance ratio of the elements other than Li is 1, "a" indicating the amount of substance ratio of Li corresponds to the amount of substance ratio of lithium and the element (Me) other than lithium (hereinafter, also referred to as "Li/Me"). Furthermore, the range of "a" is $0.97 \leq a \leq 1.25$, and preferably $1.00 \leq a \leq 1.15$. When the value of "a" is in the above range, the reaction resistance of the positive electrode is decreased, and the output of the battery can be improved. Furthermore, the range of "a" may be $1.00 \leq a \leq 1.05$.

(Manganese)

In the above-described amount of substance ratio, the range of "x" indicating the amount of substance ratio of Mn is $0.03 \leq x \leq 0.30$, preferably $0.05 \leq x \leq 0.15$, and more preferably $0.05 \leq x \leq 0.10$. When the value of "x" is in the above range, a high battery capacity and high thermal stability can be attained. On the other hand, when the value of "x" is less than 0.03, the thermal stability improving effect is not obtainable. Furthermore, when the value of "x" exceeds 0.30, the battery capacity is decreased. Furthermore, by containing manganese in the above range, in the firing process (S20) to be described below, the firing temperature can be rised, and the dispersion of titanium or the like can be promoted.

(Element M)

In the above-described amount of substance ratio, the element M is at least one element selected from the group consisting of Co, V, Mg, Mo, Ca, Cr, Ta, Na, W, Fe, Zn, B, Si, P, Zr, and Al. Furthermore, the range of "y" indicating the amount of substance ratio of the element M is $0 \leq y \leq 0.30$, and preferably $0 \leq y \leq 0.15$. When "y" is 0 or more, thermal stability, storage characteristics, battery characteristics, and the like can be improved. On the other hand, when "y" exceeds 0.30, the crystal structure becomes unstable, and thus a compound having a layered crystal structure may not be formed, or a battery capacity may be decreased by a relative decrease in the ratio of Ni or Mn. For example, when M includes Co, superior battery capacity and output characteristics are attained. When M is Co, $0 \leq y \leq 0.10$ is preferable.

Furthermore, when the amount of substance ratio of Co included in the element M is designated as "y1", the amount of substance ratio is preferably $0 < y1 \leq 0.10$, and more preferably $0.01 \leq y1 \leq 0.10$.

(Titanium)

In the above-described amount of substance ratio, the range of "z" indicating the amount of substance ratio of Ti is $0.005 \leq z \leq 0.05$. As described above, when titanium is contained in the above range along with niobium, the volume resistivity when the lithium-nickel-manganese composite oxide is compressed can be extremely increased, and oxygen releasing when used in a positive electrode of a secondary battery is suppressed, so that high thermal stability can be obtained. On the other hand, when the value of "z" is less than 0.005, the thermal stability improving effect is not sufficient. Furthermore, when the value of "z" exceeds 0.05, the percentage of Ni or Mn is relatively decreased, the crystal structure is not stable, and cationic mixing is likely to occur, so that the battery capacity may be greatly decreased.

(Niobium)

In the above-described amount of substance ratio, the range of "w" indicating the amount of substance ratio of Nb is $0.001 < w \leq 0.03$, preferably $0.002 \, w \leq 0.03$, more preferably $0.002 \leq w \leq 0.02$, and further preferably $0.002 \leq w \leq 0.01$. As described above, by containing niobium in the above range along with titanium, even when a small content of niobium is used, the volume resistivity when the lithium-nickel-manganese composite oxide is compressed can be extremely increased, and oxygen releasing when used in a positive electrode of a secondary battery is suppressed, so that high thermal stability can be attained.

Furthermore, regarding the above-described amount of substance ratio, the sum (z+w) of the amount of substance ratio (z) of titanium and the amount of substance ratio (w) of niobium is 0.06 or less, preferably 0.05 or less, and more preferably 0.03 or less. When "z+w" is in the above range, a higher battery capacity can be obtained while high thermal stability is attained.

Furthermore, regarding the above-described amount of substance ratio, the amount of substance ratio (w) of niobium is smaller than the amount of substance ratio (z) of titanium (z>w), $z \geq 2w$ is preferable, $z \geq 3w$ is more preferable, and $z \geq 4w$ is further preferable. Since niobium is a more expensive element than titanium, by decreasing the content of niobium to be smaller than that of titanium, production cost can be reduced, and by combining niobium with titanium, high thermal stability can be attained.

(Nickel)

In the above-described amount of substance ratio, (1−x−y−z−w) indicating the amount of substance ratio of Ni is 0.34 or more, preferably 0.5 or more, more preferably 0.65 or more, more preferably 0.70 or more, and further preferably 0.80 or more, and may be 0.90 or more. When the amount of substance ratio of nickel is in the above range, a secondary battery having a high battery capacity can be obtained. When the amount of substance ratio of nickel is high, a battery capacity is improved, but thermal stability may be decreased. However, the lithium-nickel-manganese composite oxide according to the present embodiment has the composition as described above, and thus can have high thermal stability regardless of a high nickel ratio.

Note that, the composition of the lithium-nickel-manganese composite oxide can be measured by quantitative analysis using inductive coupled plasma (ICP) emission spectrometry.

(Distribution of Niobium)

At least a part of niobium (Nb) contained in the lithium-nickel-manganese composite oxide according to the present embodiment is preferably segregated to a grain boundary between primary particles. The segregation of niobium can be confirmed, for example, by surface analysis/line analysis of the composition of cross-sections of primary particles to detect the concentration of niobium of at least a part of the grain boundary between primary particles by energy dispersive X-ray spectroscopy (EDX) using a scanning transmission electron microscope (S-TEM). Note that, at least a part of niobium may exist inside primary particles.

Furthermore, the niobium concentration at the grain boundary between primary particles, as determined by STEM-EDX, with respect to the niobium concentration inside primary particles is preferably 1.3 times or more and more preferably 1.5 times or more. Note that, the upper limit of the niobium concentration is not particularly limited, and for example, is 5 times or less.

Note that, the concentration of niobium inside primary particles or at the grain boundary can be confirmed by surface analysis/line analysis/point analysis of the composition of cross sections of a plurality of secondary particles by EDX measurement using a scanning transmission electron microscope (S-TEM).

For example, the niobium concentration at a grain boundary between primary particles can be obtained by randomly selecting twenty regions including the grain boundary between primary particles (for example, as illustrated in FIG. 18, regions that are measurement regions of 130 nm×130 nm and include the grain boundary so that the grain boundary crosses in the region) from cross-sections of a plurality of secondary particles, confirming the composition of each region by point analysis, and calculating an average value thereof. Furthermore, similarly, the niobium concentration in primary particles can be obtained by randomly selecting twenty regions inside the primary particles (for example, regions of 130 nm×130 nm and not including the grain boundary: see FIG. 17), analyzing the composition of each region, and calculating an average value thereof.

(Distribution of Titanium)

The distribution of titanium (Ti) contained in the lithium-nickel-manganese composite oxide according to the present embodiment is not particularly limited, titanium may exist on at least one of the surface and the grain boundary of primary particles or may be solid-solved inside primary particles. However, from the viewpoint of improving a battery capacity in a secondary battery, titanium is preferably solid-solved. Herein, the state where titanium is solid-solved indicates, for example, a state where titanium is detected inside primary particles by surface analysis of secondary particle cross-section by using EDX with S-TEM and condensation of titanium at the interface of primary particles is not confirmed, and it is preferable that titanium is detected over all cross-sections inside primary particles.

For example, the titanium concentration at the grain boundary between primary particles, as determined by STEM-EDX, with respect to the titanium concentration inside primary particles is preferably less than 1.3 times, preferably 1.2 times or less, and preferably 1.1 times or less, and may be 1.0 time or less. Furthermore, the lower limit of the titanium concentration at the grain boundary between primary particles with respect to the titanium concentration inside primary particles may be 0.6 times or more, may be 0.7 times or more, and for example, may be 0.8 times or more and 1.2 times or less, and may be 0.9 or more and 1.1 times or less. Note that, the titanium concentration can be measured by surface analysis using EDX with S-TEM, similarly to the niobium concentration described above.

Note that, in the lithium-nickel-manganese composite oxide according to the present embodiment, the distribution of metal elements other than niobium (Nb) and titanium (Ti) described above is not particularly limited, and for example, when the lithium-nickel-manganese composite oxide contains Ni, Mn, and Co as the element M, it is preferable that these metal elements are detected over all cross-sections inside a plurality of primary particles constituting the secondary particles.

[Volume Average Particle Size (Mv)]

The volume average particle size (Mv) of the positive electrode active material according to the present embodiment is preferably 8 μm or more and 20 μm or less, and more preferably 10 μm or more and 17 μm or less. In a case where the volume average particle size (Mv) is in the above range, when the positive electrode active material is used for a positive electrode of a secondary battery, it is possible to achieve both high output characteristics and battery capacity and high filling properties to the positive electrode.

Meanwhile, when the volume average particle size (Mv) is less than 8 μm, high filling properties to the positive electrode cannot be obtained in some cases. Furthermore, when the volume average particle size (Mv) exceeds 20 μm, high output characteristics and battery capacity may not be obtained in some cases. Note that, the volume average particle size (Mv) can be determined from, for example, a volume integrated value measured with a laser light diffraction scattering type particle size distribution analyzer.

[(D90−D10)/Mv] (Particle Size Distribution Width)

The positive electrode active material according to the present embodiment preferably has [(D90−D10)/Mv] of 0.80 or more and 1.20 or less. Note that, [(D90−D10)/Mv] indicates a particle size distribution width of particle sizes of particles constituting the positive electrode active material, the particle size distribution width being calculated by D90 and D10 (particle sizes at 90% and 10% in volume integration of particle amounts in a particle size distribution curve) and a volume average particle size (Mv) in a particle size distribution obtained by a laser light diffraction scattering method.

When the particle size distribution of the particles constituting the positive electrode active material is wide, there are many fine particles each having a particle size smaller than the volume average particle size (Mv) and many coarse particles each having a particle size larger than the average particle size. When the particle size distribution width is in the above range, fine particles and coarse particles are appropriately mixed, a packing density is increased, and an energy density per volume can be increased. Furthermore, from the viewpoint of improving the energy density per volume, [(D90−D10)/Mv] may be 0.90 or more, and may be 0.95 or more.

On the other hand, when the particle size distribution width of the positive electrode active material is less than 0.80, the volume energy density is decreased. Furthermore, when the method for producing a positive electrode active material according to the present embodiment is used, the upper limit is about 1.20. Note that, in the firing process (S20) described below, when the firing temperature exceeds 1000° C., the particle size distribution width may exceed 1.20. In this case, when the positive electrode active material is formed, the specific surface area is decreased to increase the resistance of the positive electrode so that the battery capacity may be decreased.

[Volume Resistivity when Compressed to 4.0 g/Cm$^3$]

The positive electrode active material obtained after the firing process (S20) has a volume resistivity, as determined by powder resistivity measurement, when compressed to 4.0 g/cm$^3$, of $5.0 \times 10^2$ Ω·cm or more and $1.0 \times 10^5$ Ω·cm or less, preferably $1.0 \times 10^3$ Ω·cm or more and $1.0 \times 10^4$ Ω·cm or less, and more preferably $2.0 \times 10^3$ Ω·cm or more and $1.0 \times 10^4$ Ω·cm or less. When the volume resistivity of the positive electrode active material is in the above range, high thermal stability during short circuit can be obtained. Generally, a superior active material having a low resistance in the electrochemical reaction as the electroconductivity of the positive electrode active material is high is conceivable, but in the case of taking thermal stability during short circuit into consideration, by making a volume resistivity appropriately high, generation of a rapid increase in current during short circuit can be suppressed.

Note that, the volume resistivity can be determined, for example, by weighing the positive electrode active material within a range of 4.5 g or more and 5.5 g or less, pressure-molding the positive electrode active material into a cylindrical shape having a diameter of 20 mm to 4.0 g/cm$^3$, and then performing measurement in a pressurized state by a resistivity test method using a four-probe method in accordance with JIS K 7194: 1994.

[Maximum Oxygen Generation Peak Temperature]

The maximum oxygen generation peak temperature of the positive electrode active material obtained after the firing process (S20) in an overcharged state at the time of rising the temperature is preferably 250° C. or higher and more preferably 260° C. or higher. The upper limit of the maximum oxygen generation peak temperature at the time of rising the temperature is not particularly limited, and is about 300° C. or lower.

Furthermore, the maximum oxygen generation peak temperature of the positive electrode active material obtained after the water-washing process (S30) and the drying process (S40) in an overcharged state at the time of rising the temperature is preferably 250° C. or higher.

The upper limit of the maximum oxygen generation peak temperature at the time of rising the temperature is not particularly limited, and is about 300° C. or lower. Note that, the maximum oxygen generation peak temperature can be measured by the method described in Examples. Furthermore, the maximum oxygen generation peak temperature refers to a peak temperature at which oxygen generated at the time of rising the temperature becomes a local and global maximum.

[Eluted Lithium Amount]

It is preferable that the amount of lithium eluted in water (eluted lithium amount) when the positive electrode active material according to the present embodiment is immersed in water is smaller than the eluted lithium amount of a positive electrode active material produced under the same conditions, except that the water-washing process (S30) and the drying process (S40) described below are not performed. By decreasing the eluted lithium amount to a specific amount, the crystallinity of the positive electrode active material is improved and a discharge capacity is improved, and gelling of the positive electrode mixture paste at the time of producing an electrode plate of a secondary battery can be suppressed.

In the positive electrode active material obtained after performing the water-washing process (S30) and the drying process (S40), the amount of lithium eluted in water (eluted lithium amount) when the positive electrode active material is immersed in water is preferably 0.20% by mass or less and more preferably 0.10% by mass or less with respect to the entire positive electrode active material, may be 0.08% by mass or less, and may be 0.06% by mass or less. Furthermore, the lower limit of the eluted lithium amount is not particularly limited, and for example, is 0.01% by mass or more. When the eluted lithium amount is in the above range, excessive lithium in the lithium-nickel-manganese composite oxide is pulled out, occurrence of gelling of the positive electrode mixture paste, or the like can be suppressed. Note that, when the eluted lithium amount is less than 0.01% by mass, lithium may be excessively pulled out from the lithium-nickel-manganese composite oxide at the time of water-washing, and in this case, battery characteristics deteriorate.

Note that, the eluted lithium amount can be measured by fractionating 2 g of the positive electrode active material, putting the positive electrode active material into 125 ml of pure water at room temperature stirred with a stirrer, and performing titration using an HCl aqueous solution immediately after putting the active material thereinto. The titration was evaluated by the Warder method, the lithium hydroxide (LiOH) amount and the lithium carbonate (Li$_2$CO$_3$) amount were calculated, and the sum of these lithium amounts was calculated as eluted lithium.

Note that, the lithium-nickel-manganese composite oxide according to the present embodiment may contain an element other than the aforementioned metal elements (Li, Ni, Mn, the element M, Nb, and Ti), and oxygen at a small amount in the range that does not impair the effect of the present invention. Furthermore, as for lithium-nickel-manganese composite oxide contained in the positive electrode active material, other than secondary particles, primary particles may be contained alone at a small amount. Furthermore, the positive electrode active material may contain a compound other than the above-described lithium-nickel-manganese composite oxide.

2. Method for Producing Positive Electrode Active Material for Lithium Ion Secondary Battery FIG. 6 to FIG. 15 are diagrams illustrating examples of a method for producing a positive electrode active material for a lithium ion secondary battery according to the present embodiment (hereinafter, also referred to as "method for producing a positive electrode active material"). By the production method according to the present embodiment, a positive electrode active material containing the above-described lithium-nickel-manganese composite oxide can be easily produced on an industrial scale.

The method for producing a positive electrode active material according to the present embodiment includes a mixture preparation process (S10) of preparing a mixture containing at least a nickel-manganese composite compound, a lithium compound, and optionally one or both of a titanium compound and a niobium compound; and a firing process (S20) of firing the mixture so as to obtain the lithium-nickel-manganese composite oxide, in which the nickel-manganese composite compound contains nickel (Ni), manganese (Mn), optionally an element M (M) that is at least one element selected from the group consisting of Co, V, Mg, Mo, Ca, Cr, Ta, Na, W, Fe, Zn, B, Si, P, Zr, and Al, titanium (Ti), and niobium (Nb), and an amount of substance ratio of the respective elements is represented as Ni:Mn:M:Ti:Nb=(1−x−y):x:y:z':w' (provided that, $0.03 \leq x \leq 0.30$, $0 \leq y \leq 0.30$, $0 \leq z' \leq 0.05$, and $0 \leq w' \leq 0.03$), and an amount of substance ratio (z) of titanium and an amount of substance ratio (w) of niobium to a total amount of substance of nickel, manganese, the element M, titanium, and niobium in the mixture prepared in the mixture preparation process satisfy $0.005 \leq z \leq 0.05$, $0.001 < w \leq 0.03$, $(z+w) \leq 0.06$, and $z > w$.

Figure 6:
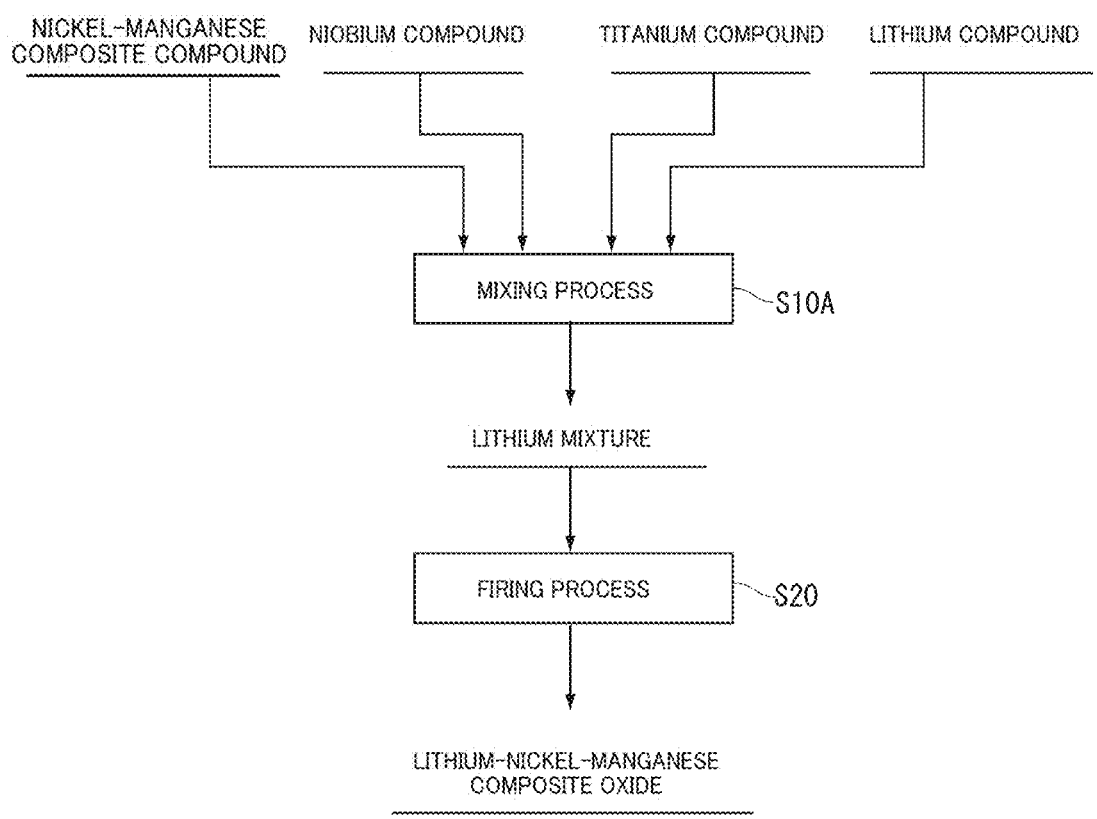
FIG. 6 is a diagram illustrating an example of a method for producing a positive electrode active material according to the present embodiment.

The production method according to the present embodiment may include, for example, as illustrated in FIG. 6, a mixture preparation process (S10A) of mixing a nickel-manganese composite compound, a titanium compound, a niobium compound, and a lithium compound to prepare a mixture and a firing process (S20) of firing the mixture to obtain lithium-nickel-manganese composite oxide.

Figure 8:
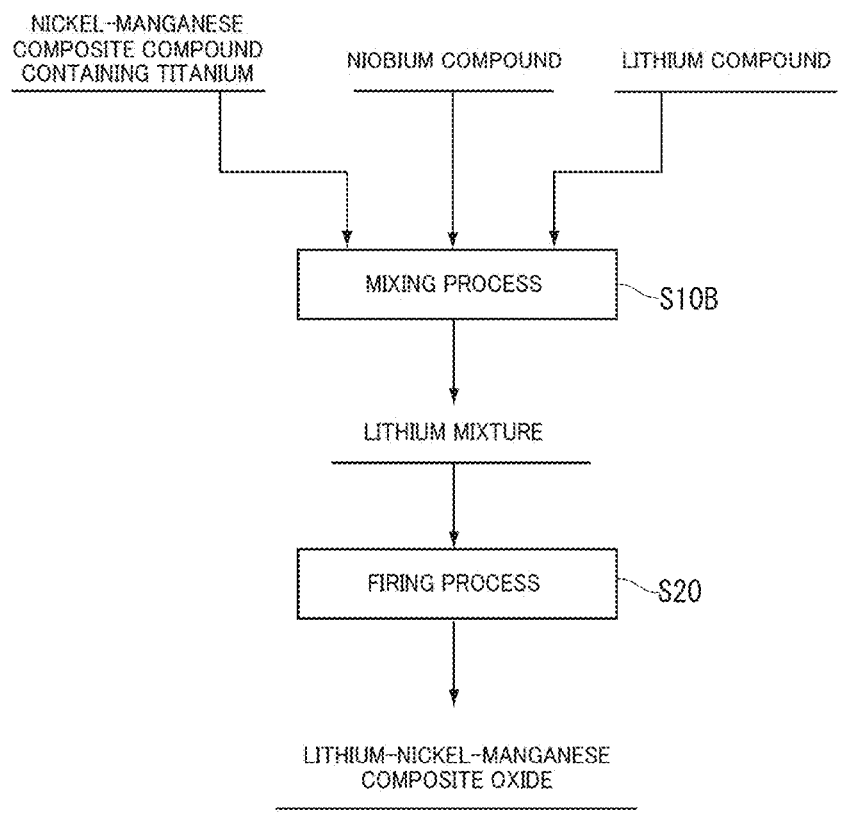
FIG. 8 is a diagram illustrating an example of the method for producing a positive electrode active material according to the present embodiment.

Furthermore, the production method according to the present embodiment may include, for example, as illustrated in FIG. 8, a mixture preparation process (S10B) of mixing at least a nickel-manganese composite compound containing titanium, a niobium compound, and a lithium compound to prepare a mixture and a firing process (S20) of firing the mixture to obtain lithium-nickel-manganese composite oxide.

Figure 11:
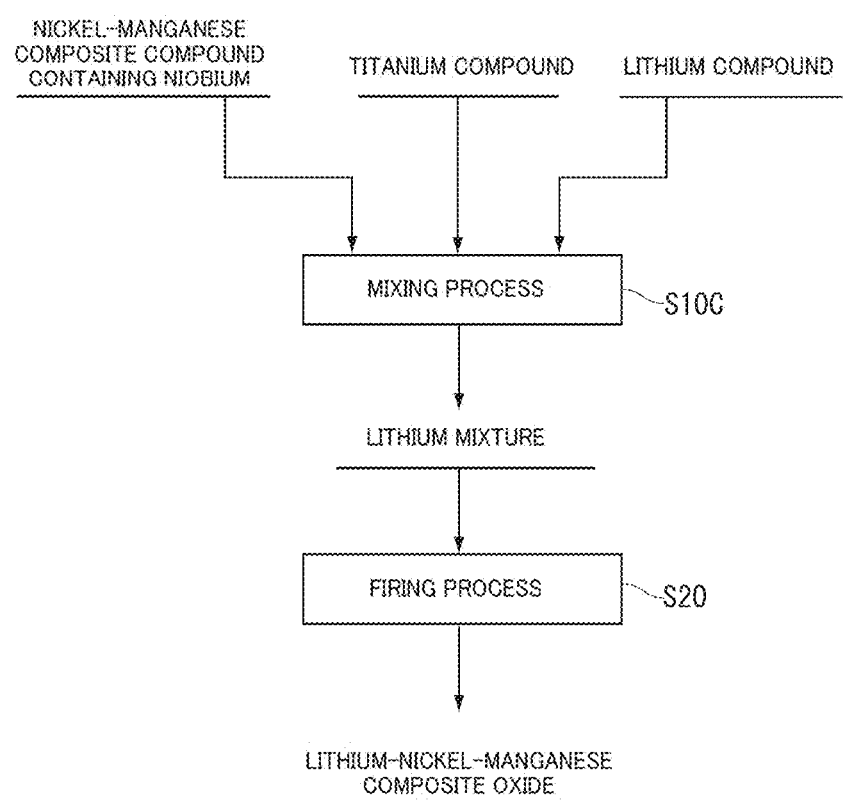
FIG. 11 is a diagram illustrating an example of the method for producing a positive electrode active material according to the present embodiment.

Furthermore, the production method according to the present embodiment may include, for example, as illustrated in FIG. 11, a mixture preparation process (S10C) of mixing at least a nickel-manganese composite compound containing niobium, a titanium compound, and a lithium compound to prepare a mixture and a firing process (S20) of firing the mixture to obtain lithium-nickel-manganese composite oxide.

Furthermore, in the mixture preparation process (S10D), the mixture may be prepared by mixing at least a nickel-manganese composite compound containing titanium and niobium and a lithium compound.

Figure 13:
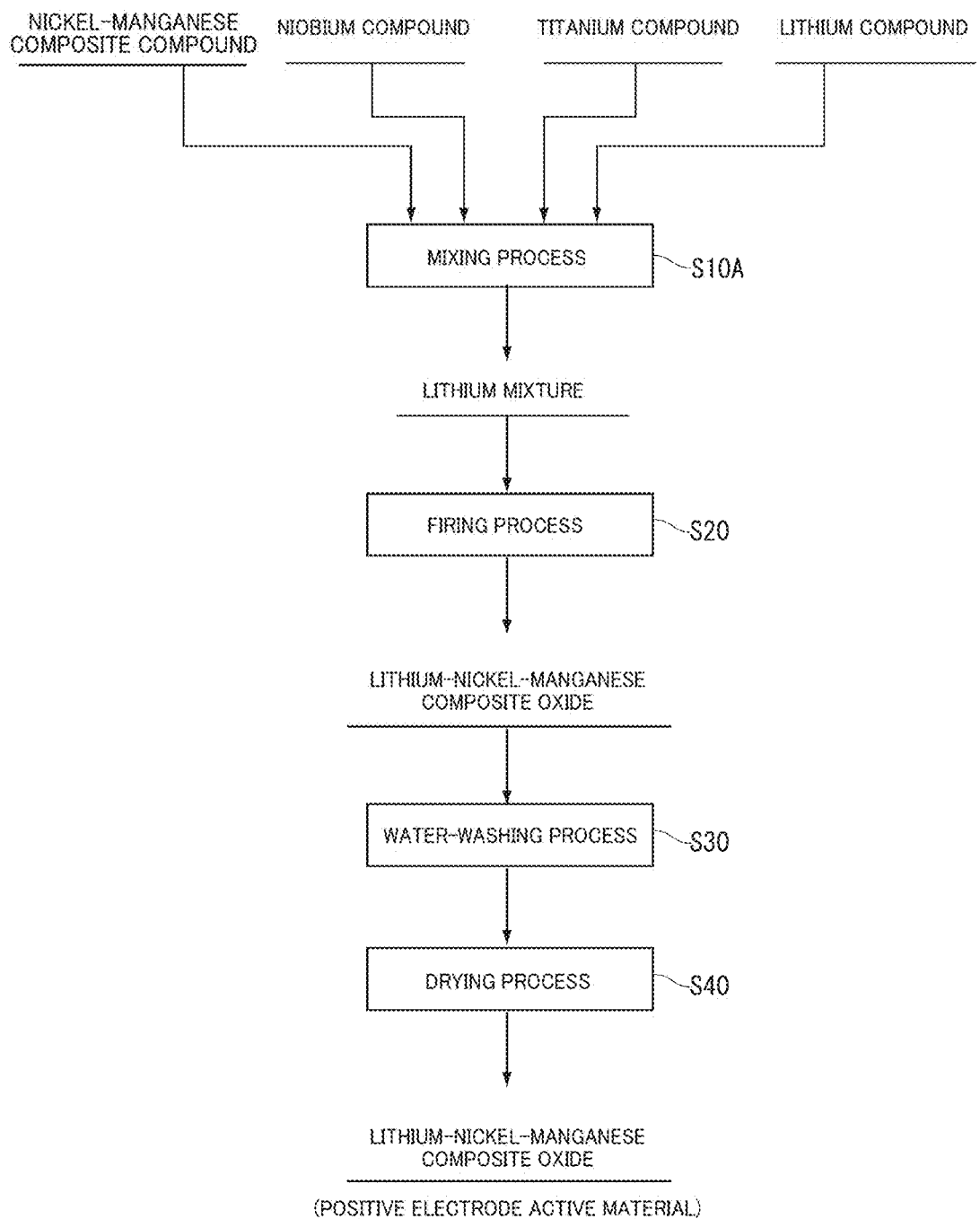
FIG. 13 is a diagram illustrating an example of the method for producing a positive electrode active material according to the present embodiment (including a water-washing process and a drying process).

Furthermore, the production method according to the present embodiment may include, for example, as illustrated in FIG. 13, a mixture preparation process (S10A) of mixing at least a nickel-manganese composite compound, a titanium compound, a niobium compound, and a lithium compound to prepare a mixture, a firing process (S20) of firing the mixture to obtain the lithium-nickel-manganese composite oxide, a water-washing process (S30) of mixing and stirring the obtained lithium-nickel-manganese composite oxide with water and then performing solid-liquid separation, and a drying process (S40) of drying the lithium-nickel-manganese composite oxide obtained after water-washing (precipitate).

Figure 14:
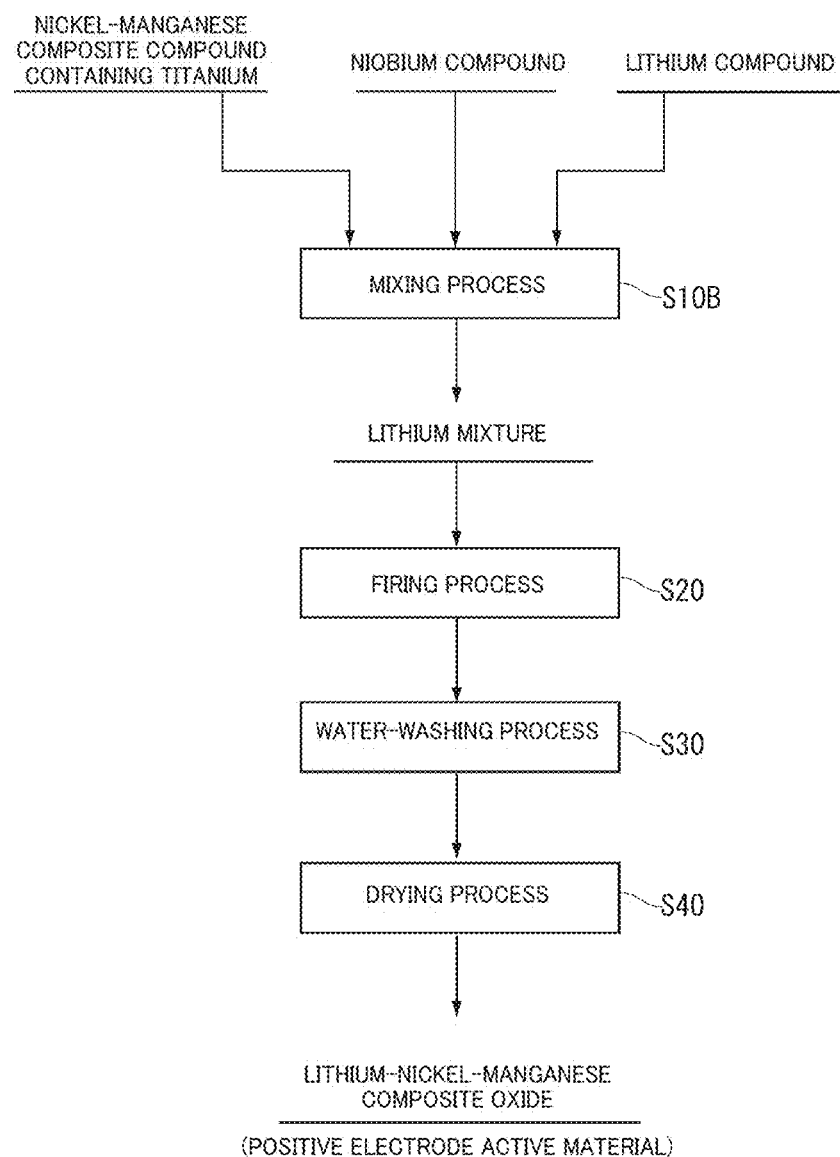
FIG. 14 is a diagram illustrating an example of the method for producing a positive electrode active material according to the present embodiment (including a water-washing process and a drying process).

Furthermore, the production method according to the present embodiment may include, for example, as illustrated in FIG. 14, a mixture preparation process (S10B) of mixing at least a nickel-manganese composite compound containing titanium, a niobium compound, and a lithium compound to prepare a mixture, a firing process (S20) of firing the mixture to obtain the lithium-nickel-manganese composite oxide, a water-washing process (S30) of mixing and stirring the obtained lithium-nickel-manganese composite oxide with water and then performing solid-liquid separation, and a drying process (S40) of drying the lithium-nickel-manganese composite oxide obtained after water-washing (precipitate).

Figure 15:
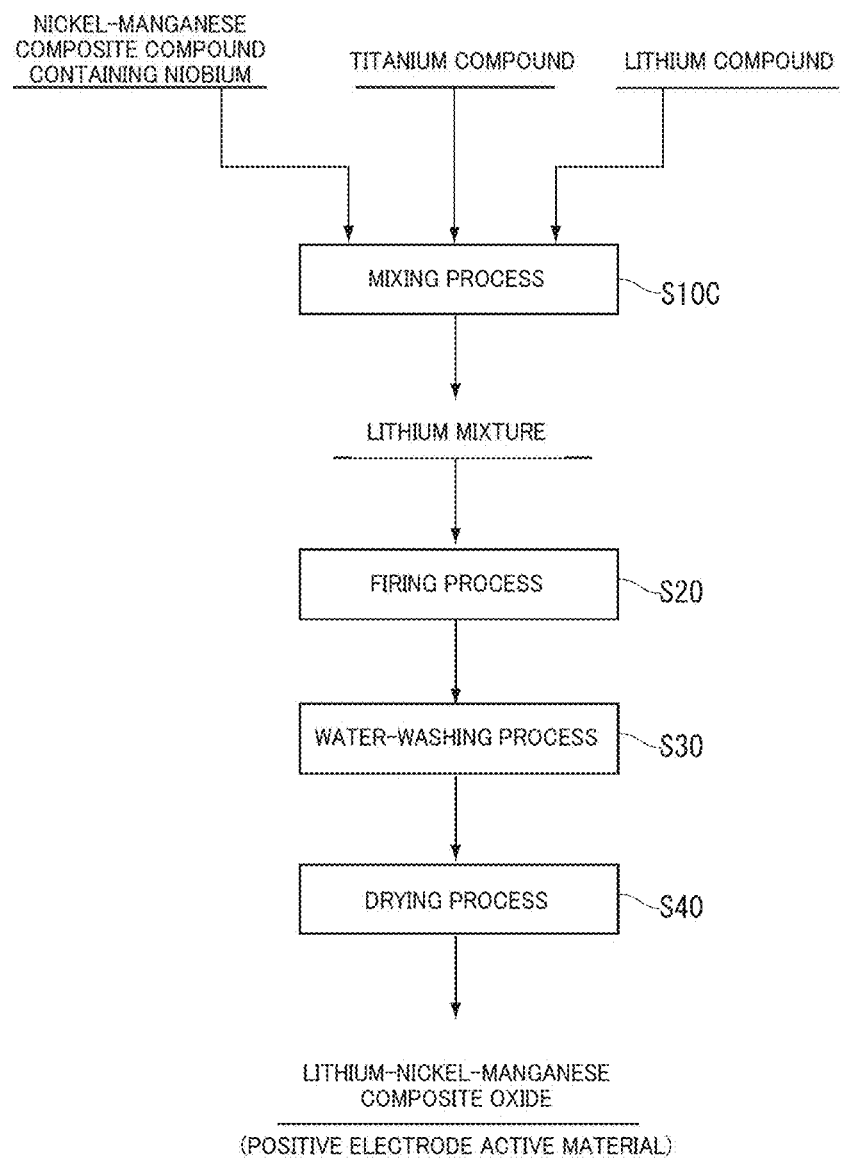
FIG. 15 is a diagram illustrating an example of the method for producing a positive electrode active material according to the present embodiment (including a water-washing process and a drying process).

Furthermore, the production method according to the present embodiment may include, for example, as illustrated in FIG. 15, a mixture preparation process (S10C) of mixing at least a nickel-manganese composite compound containing niobium, a titanium compound, and a lithium compound to prepare a mixture, a firing process (S20) of firing the mixture to obtain the lithium-nickel-manganese composite oxide, a water-washing process (S30) of mixing and stirring the obtained lithium-nickel-manganese composite oxide with water and then performing solid-liquid separation, and a drying process (S40) of drying the lithium-nickel-manganese composite oxide obtained after water-washing (precipitate).

Hereinafter, regarding the production method according to the present embodiment, each process will be specifically described. Note that, the following description is an example of the production method according to the present embodiment and does not limit the production method.

[Crystallization Process (S1A and S1B)]

Figure 7A:
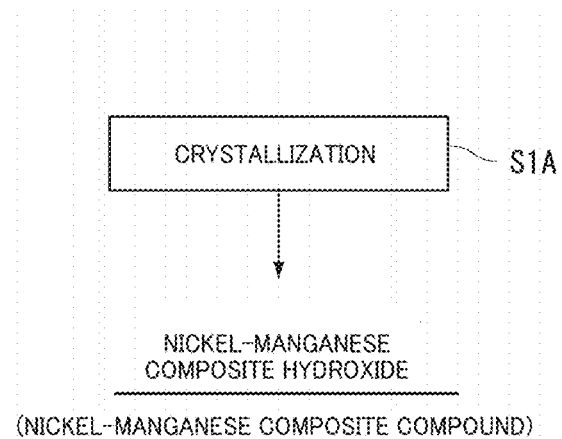
FIG. 7(A) and FIG. 7(B) are diagrams illustrating an example of a method for producing a nickel-manganese composite compound according to the present embodiment.
Figure 7B:
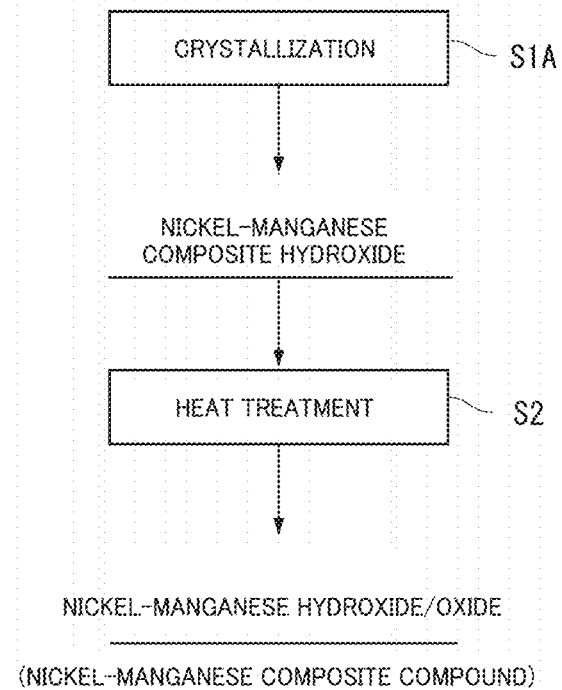

It is preferable that the nickel-manganese composite compound to be used in the mixture preparation process (S10A) is obtained, for example, as illustrated in FIG. 7(A) and FIG. 7(B), by a method including a crystallization process (S1A) and/or a heat treatment process (S2).

Figure 9A:
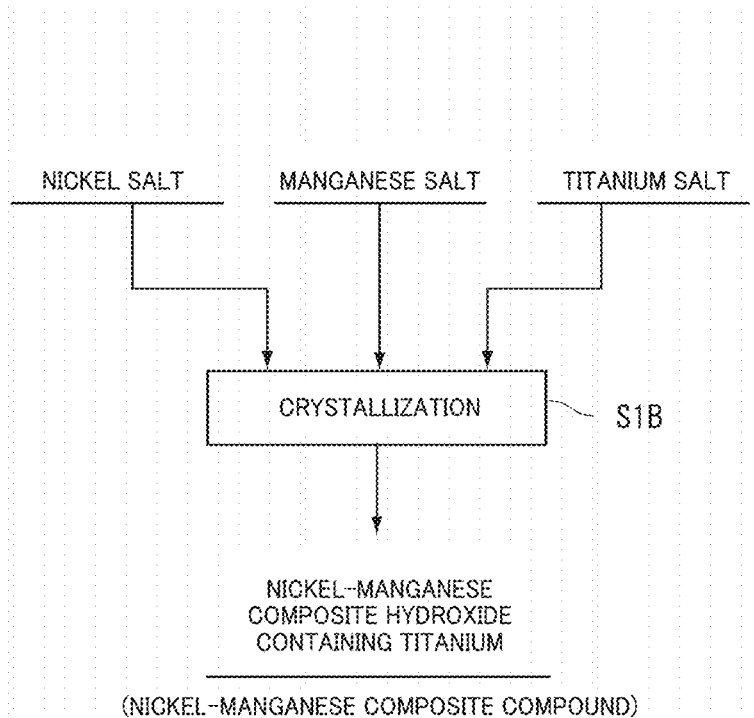
FIG. 9(A) and FIG. 9(B) are diagrams illustrating an example of a method for producing a nickel-manganese composite compound containing titanium according to the present embodiment.
Figure 9B:
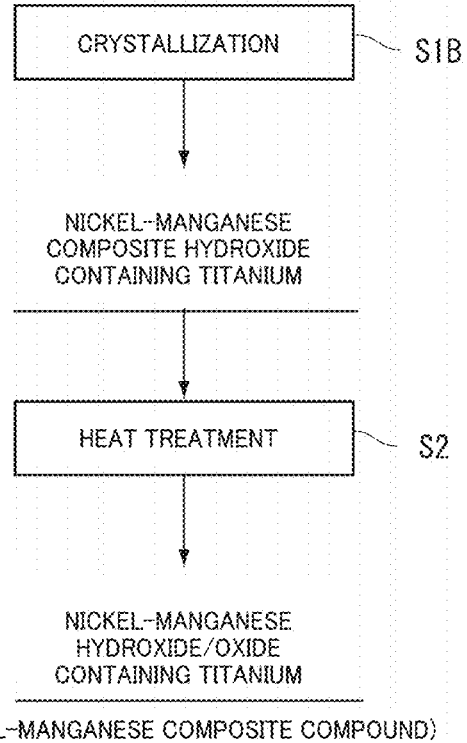

Furthermore, it is preferable that the nickel-manganese composite compound containing titanium to be used in the mixture preparation process (S10B) is obtained, for example, as illustrated in FIG. 9(A) and FIG. 9(B), by a method including a crystallization process (S1B) and/or a heat treatment process (S2).

Furthermore, the nickel-manganese composite compound containing niobium to be used in the mixture preparation process (S10C) can be obtained, for example, by changing a titanium salt illustrated in FIG. 9(A) to a niobium salt. Furthermore, the nickel-manganese composite compound containing titanium and niobium to be used in the mixture preparation process (S10D) can be obtained, for example, by adding a niobium salt along with a titanium salt illustrated in FIG. 9(A).

It is preferable that the nickel-manganese composite hydroxide obtained in the crystallization process (S1A) contains nickel (Ni), manganese (Mn), and optionally an element M (M) that is at least one element selected from the group consisting of Co, V, Mg, Mo, Ca, Cr, Ta, Na, W, Fe, Zn, B, Si, P, Zr, and Al, as elements other than the hydroxyl group (OH), and an amount of substance ratio (A) of the respective elements is represented as Ni:Mn:M=(1−x−y):x:y (provided that $0.03 \leq x \leq 0.30$ and $0 \leq y \leq 0.30$).

It is preferable that the nickel-manganese composite hydroxide obtained in the crystallization process (S1B) contains nickel (Ni), manganese (Mn), titanium (Ti), and optionally an element M (M) that is at least one element selected from the group consisting of Co, V, Mg, Mo, Ca, Cr, Ta, Na, W, Fe, Zn, B, Si, P, Zr, and Al, as elements other than the hydroxyl group (OH), and an amount of substance ratio (B) of the respective elements is represented as Ni:Mn:M:Ti=(1−x−y−z'):x:y:z' (provided that, $0.03 \leq x \leq 0.30$, $0 \leq y \leq 0.30$, and $0.005 \leq z' \leq 0.05$). Note that, the crystallization process (S1B) can be performed under the same conditions as in the crystallization process (S1A), except that a salt containing titanium (titanium salt) is added as a raw material to obtain nickel-manganese composite hydroxide containing titanium.

Furthermore, it is preferable that the nickel-manganese composite hydroxide containing niobium contains nickel (Ni), manganese (Mn), niobium (Nb), and optionally an element M (M) that is at least one element selected from the group consisting of Co, V, Mg, Mo, Ca, Cr, Ta, Na, W, Fe, Zn, B, Si, P, Zr, and Al, as elements other than the hydroxyl group (OH), and an amount of substance ratio (C) of the respective elements is represented as Ni:Mn:M:Nb=(1−x−y−w'):x:y:w' (provided that, $0.03 \leq x \leq 0.30$, $0 \leq y \leq 0.30$, and $0.001 < w' \leq 0.03$). Note that, nickel-manganese composite hydroxide containing niobium can be obtained under the same conditions as in the crystallization process (S1B), except that in the crystallization process (S1B), a salt containing niobium (niobium salt) is added as a raw material instead of a titanium salt to obtain nickel-manganese composite hydroxide containing niobium.

The crystallization processes (S1A) and (S1B) can be performed by a known crystallization method as long as nickel-manganese composite hydroxide having the above amount of substance ratio (molar ratio) is obtainable. Hereinafter, an example of the crystallization process of obtaining a nickel-manganese composite hydroxide by crystallization will be described.

For example, while the mixed aqueous solution containing at least nickel and manganese is stirred at a certain speed, a neutralizer is added in a reaction tank to form a reaction aqueous solution, the pH of the reaction aqueous solution is controlled by neutralization, and thus nickel-manganese composite hydroxide is generated by coprecipitation (crystallization).

As the mixed aqueous solution containing nickel and manganese, an aqueous solution containing a nickel salt and a manganese salt, for example, a sulfate salt solution, nitrate salt solution, chloride solution, or the like of nickel and manganese can be used. Note that, an aqueous solution containing nickel and an aqueous solution containing manganese may be separately prepared and then respectively supplied into a reaction tank, and thus a mixed aqueous solution containing nickel and manganese may be prepared.

Further, as described below, the mixed aqueous solution may contain the element M. Furthermore, when nickel-manganese composite hydroxide containing titanium and/or niobium is obtained, the mixed aqueous solution may contain titanium and/or niobium. The composition of each metal element contained in the mixed aqueous solution almost matches the composition of each metal element contained in nickel-manganese composite hydroxide to be obtained. Hence, the composition of the metal elements in the mixed aqueous solution can be adjusted so as to be the same as the composition of each metal element in the intended nickel-manganese composite hydroxide.

As the neutralizer, an alkaline aqueous solution can be used, and for example, sodium hydroxide, potassium hydroxide, or the like can be used.

Furthermore, a complexing agent may be added to the reaction aqueous solution along with the neutralizer. The complexing agent is not particularly limited as long as it can form a complex by binding with a nickel ion or another metal ion in the reaction aqueous solution in the reaction tank, a known complexing agent can be used, and for example, an ammonium ion supplier can be used. The ammonium ion supplier is not particularly limited, but for example, ammonia, ammonium sulfate, ammonium chloride, ammonium carbonate, or ammonium fluoride can be used. The solubility of the metal ions in the reaction aqueous solution can be adjusted by adding a complexing agent.

In the crystallization process (S1A) or (S1B), when a complexing agent is not used, regarding the temperature of the reaction aqueous solution, the temperature (liquid temperature) is preferably set to be in a range of higher than 60° C. and 80° C. or lower and the pH of the reaction aqueous solution at the above temperature is preferably 10 or more and 12 or less (at standard 25° C.). When the pH of the reaction aqueous solution exceeds 12, the nickel-manganese composite hydroxide to be obtained becomes fine particles, the filterability deteriorates, and spherical particles may not be obtained. On the other hand, when the pH of the reaction aqueous solution is less than 10, the generation speed of nickel-manganese composite hydroxide remarkably decreases, Ni remains in the filtrate, the precipitated Ni amount deviates from the intended composition, and the nickel-manganese composite hydroxide having the intended ratio may not be obtained.

Furthermore, when the temperature of the reaction aqueous solution exceeds 60° C., the solubility of Ni increases, and the precipitated Ni amount deviates from the intended composition, and the phenomenon that coprecipitation does not occur can be avoided. On the other hand, when the temperature of the reaction aqueous solution exceeds 80° C., the slurry concentration (reaction aqueous solution concentration) increases due to the great evaporated moisture amount, and the solubility of Ni decreases, crystals such as sodium sulfate are generated in the filtrate, the concentration of impurities increases, and there is the possibility that the charge and discharge capacity of the positive electrode active material decreases.

In the crystallization process (S1A) or (S1B), when a complexing agent such as an ammonium ion supplier is used, the temperature of the reaction aqueous solution is preferably 30° C. or higher and 60° C. or lower since the solubility of Ni in the reaction aqueous solution is increased, and the pH of the reaction aqueous solution is preferably 10 or more and 13 or less (at standard 25° C.) and more preferably 12 or more and 13 or less.

Furthermore, the ammonia concentration in the reaction aqueous solution is preferably maintained at a constant value within a range of 3 g/L or more and 25 g/L or less. When the ammonia concentration is less than 3 g/L, the solubility of metal ions cannot be maintained constant, and thus composite hydroxide primary particles having well-regulated shape and particle size may not be formed. Furthermore, since it is easy to form gel-like nuclei, the particle size distribution of nickel-manganese composite hydroxide to be obtained is also likely to spread. On the other hand, when the ammonia concentration exceeds 25 g/L, the solubility of metal ions becomes too high, the metal ion content remaining in the reaction aqueous solution increases, and deviation of the composition of nickel-manganese composite hydroxide to be obtained is likely to occur. Note that, when the ammonia concentration fluctuates, the solubility of metal ions fluctuates, uniform hydroxide particles are not formed, and it is thus preferable to maintain the ammonia concentration at a constant value. For example, the ammonia concentration is preferably maintained at a desired concentration by setting the width between the upper limit and the lower limit to about 5 g/L.

Furthermore, when the nickel-manganese composite hydroxide to be obtained by crystallization contains an element M that is at least one element selected from the group consisting of Co, V, Mg, Mo, Ca, Cr, Ta, Na, W, Fe, Zn, B, Si, P, Zr, and Al, the method for blending the element M in the nickel-manganese composite hydroxide is not particularly limited, and a known method can be used. For example, from the viewpoint of enhancing productivity, a method is preferable in which an aqueous solution containing an element M is added to a mixed aqueous solution containing nickel and manganese in a reaction tank and nickel-manganese composite hydroxide containing the element M is coprecipitated.

Furthermore, when the nickel-manganese composite hydroxide to be obtained by crystallization contains titanium and/or niobium, a method of blending titanium and/or niobium in the nickel-manganese composite hydroxide is not particularly limited, and a known method can be used. For example, from the viewpoint of enhancing productivity, a method is preferable in which an aqueous solution containing titanium and/or niobium is added to a mixed aqueous solution containing nickel and manganese in a reaction tank and nickel-manganese composite hydroxide containing titanium and/or niobium is coprecipitated.

As the aqueous solution containing the element M, for example, aqueous solutions containing cobalt sulfate, vanadium oxychloride, vanadium oxysulfate, magnesium sulfate, magnesium chloride, molybdenum chloride, calcium chloride, chromium chloride, sodium tantalate, sodium hydroxide, sodium tungstate, tungsten oxide, ferrous sulfate, zinc chloride, zinc sulfate, boric acid, ammonium borate, silicon bromide, phosphoric acid, zirconium sulfate, zirconium nitrate, aluminum sulfate, sodium aluminate, and the like can be used. Furthermore, as the aqueous solution containing titanium, an aqueous solution containing a titanium salt, for example, an aqueous solution containing titanium sulfate, or the like can be used. Furthermore, as the aqueous solution containing niobium, an aqueous solution containing a niobium salt, for example, an aqueous solution obtained by dissolving niobium hydroxide, niobium pentachloride, niobic acid, or the like in potassium hydroxide or hydrochloric acid, or the like can be used.

Furthermore, from the viewpoint of optimizing the crystallization conditions to facilitate control of the composition ratio, after nickel-manganese composite hydroxide is obtained by the crystallization process (S1A), a process of coating the obtained nickel-manganese composite hydroxide with the element M may be further provided. A method for coating the element M is not particularly limited, and a known method can be used.

Figure 10:
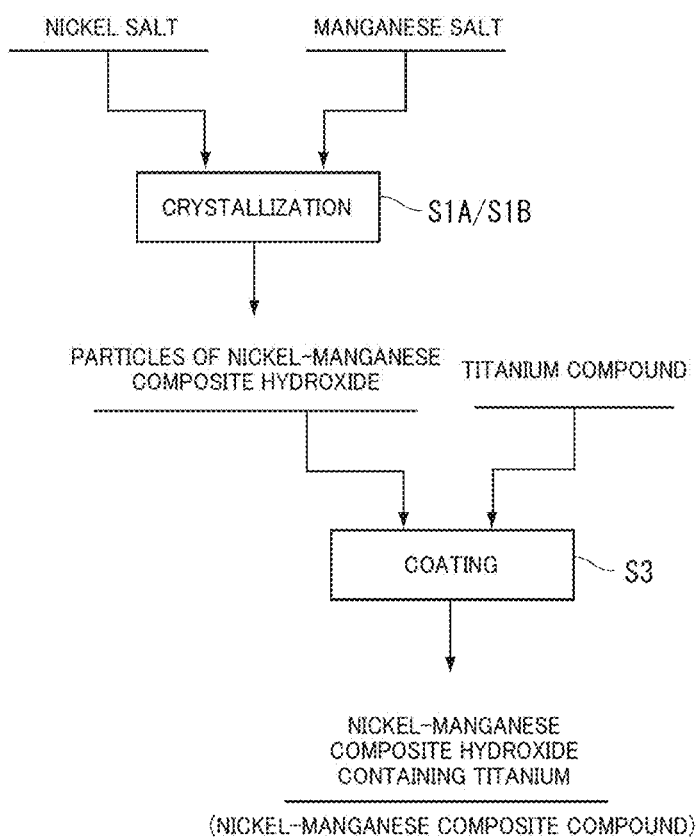
FIG. 10 is a diagram illustrating an example of the method for producing a nickel-manganese composite compound containing titanium according to the present embodiment.
Figure 12:
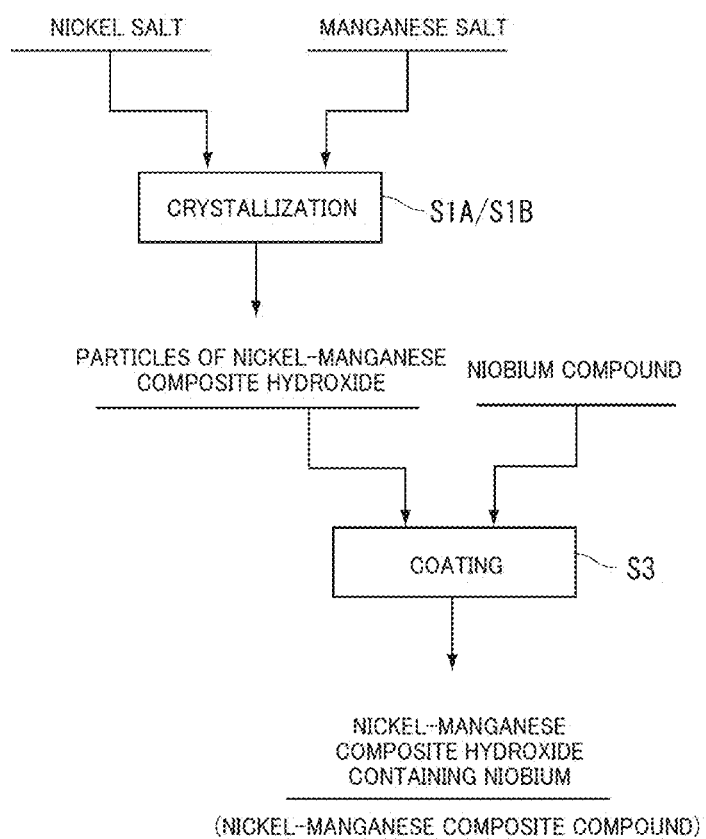
FIG. 12 is a diagram illustrating an example of a method for producing a nickel-manganese composite compound containing niobium according to the present embodiment.

Furthermore, when nickel-manganese composite hydroxide containing titanium and/or niobium is obtained, as illustrated in FIG. 10 and FIG. 12, after nickel-manganese composite hydroxide is obtained by the crystallization process (S1A) or (S1B), a coating process (S3) of coating the nickel-manganese composite hydroxide with a compound containing titanium and/or niobium may be provided. A method for coating titanium and/or niobium is not particularly limited, and a known method can be used. A method for coating titanium and/or niobium is also not particularly limited similarly to the method for coating the element M, and a known method can be used.

Hereinafter, an example of a method for coating at least one element of titanium, niobium, and the element M (hereinafter, also collectively referred to as "additive element") will be described. First, the nickel-manganese composite hydroxide obtained by crystallization is dispersed in pure water to form a slurry. Next, this slurry is mixed with an aqueous solution containing the additive element in an amount corresponding to the intended amount of coverage, and a neutralizer (an acid or alkali) is added dropwise to the mixture to adjust the pH to a predetermined value. As the acid, for example, sulfuric acid, hydrochloric acid, nitric acid, or the like is used. As the alkali, for example, sodium hydroxide, potassium hydroxide, or the like is used. Next, the slurry is mixed for a predetermined time and then the slurry is filtered and dried, thereby a nickel-manganese composite hydroxide coated with the additive element can be obtained. Note that, examples of other coating methods include a spray drying method in which a solution containing a compound containing the additive element is sprayed onto the nickel-manganese composite hydroxide and then dried and a method in which the nickel-manganese composite hydroxide is impregnated with a solution containing a compound containing the element M.

Note that, a method of blending an additive element and nickel-manganese composite hydroxide may include one or both of mixing an additive element with the above-described mixed aqueous solution and coating the nickel-manganese composite hydroxide with the additive element.

For example, 1) nickel-manganese composite hydroxide obtained by adding an alkaline aqueous solution to a mixed aqueous solution containing nickel and manganese (provided that, excluding the additive element) and subjecting the mixture to crystallization may be coated with the additive element or 2) a mixed aqueous solution containing nickel, manganese, and a part of the additive element may be prepared, nickel-manganese composite hydroxide (containing the additive element) may be coprecipitated, the coprecipitate may be coated with the additive element, and the content of the additive element may be adjusted.

For example, a method for producing nickel-manganese composite hydroxide containing titanium may include, as illustrated in FIG. 10, for example, 1) adding an alkaline aqueous solution to a mixed aqueous solution containing nickel and manganese (provided that, excluding titanium) to subject the mixture to crystallization so as to obtain nickel-manganese composite hydroxide (S1A) and coating the obtained nickel-manganese composite hydroxide with titanium (S3), or 2) producing a mixed aqueous solution containing nickel, manganese, and titanium, subjecting the mixed aqueous solution to crystallization by adding an alkaline aqueous solution and to coprecipitation so as to obtain nickel-manganese composite hydroxide containing titanium (S1B) and coating the obtained nickel-manganese composite hydroxide containing titanium (coprecipitate) with titanium (S3). When the method includes the crystallization process (S1B) and the coating process (S3), the content of titanium may be adjusted so that the total amount of titanium to be added in these processes is within the range of the amount of substance ratio (B) described above.

Note that, as a method for producing nickel-manganese composite hydroxide containing niobium, as illustrated in FIG. 12, it is possible to use the same method as the above-described method for producing nickel-manganese composite hydroxide containing titanium, except that titanium illustrated in FIG. 10 is changed to niobium.

Note that, the crystallization processes (S1A) and (S1B) may use 1) a method by batch-type crystallization (a batch-type crystallization method) or may use 2) a method by continuous crystallization (a continuous crystallization method). For example, in the case of a batch-type crystallization method, the precipitate is collected, filtered, and washed with water after the reaction aqueous solution in the reaction tank has reached a steady state to obtain nickel-manganese composite hydroxide. Furthermore, in the case of a continuous crystallization method, a mixed aqueous solution, an alkaline aqueous solution, and in some cases, an aqueous solution containing an ammonium ion supplier are continuously supplied and allowed to overflow the reaction tank to collect the precipitate, and the precipitate is filtered and washed with water to obtain nickel-manganese composite hydroxide.

In the method for producing a positive electrode active material according to the present embodiment, from the viewpoint of obtaining a positive electrode active material showing a high volume energy density when used for a secondary battery, it is preferable to use a continuous crystallization method. In the production by continuous crystallization, a positive electrode active material having a high particle size distribution width, a broad particle size distribution width, and a high filling property can be easily obtained. Furthermore, the continuous crystallization method provides higher productivity than a batch-type crystallization method and is suitable for industrial-scale production.

[Heat Treatment Process (S2)]

The nickel-manganese composite compound may be obtained, as illustrated in FIG. 7(B) and FIG. 9(B), by a method further including a heat treatment process (S2) after the crystallization process (S1A) or (S1B). Furthermore, the nickel-manganese composite compound may be obtained by a method including the aforementioned heat treatment process (S2) after the coating process (S3) as illustrated in FIG. 10 and FIG. 12.

The heat treatment process (S2) is a process of removing at least a part of moisture contained in the nickel-manganese composite hydroxide by heat treatment. When the heat treatment process (S2) is provided, it is possible to prevent variations in Li/Me in the positive electrode active material obtained in the firing process (step S20) to be described below by removing at least a part of moisture remaining in the nickel-manganese composite hydroxide.

In the heat treatment process (S2), it is sufficient that moisture in the nickel-manganese composite hydroxide can be removed to the extent that a variation in Li/Me of the positive electrode active material does not occur, but from the viewpoint of further reducing the variation in Li/Me, it is preferable that the nickel-manganese composite hydroxide is sufficiently oxidized to be converted into nickel-manganese composite oxide. Note that, it is not necessary to convert all of the nickel-manganese composite hydroxide into nickel-manganese composite oxide.

Furthermore, when the method includes the heat treatment process (S2), at least one of the nickel-manganese composite hydroxide and the nickel-manganese composite oxide obtained by the heat treatment process (S2) can be used as the nickel-manganese composite compound in the mixture preparation process (S10). Furthermore, when the nickel-manganese composite hydroxide is coated with the additive element (at least one element among titanium, niobium, and the element M), the heat treatment process (S2) may be performed after the nickel-manganese composite hydroxide is coated with a compound containing the additive element, or at least one of the nickel-manganese composite hydroxide and the nickel-manganese composite oxide obtained by the heat treatment process (S2) may be coated with a compound containing the additive element.

The heat treatment may be performed by heating under the condition in which remaining water in the nickel-manganese composite hydroxide is removed, and for example, the temperature for the heat treatment is preferably 105° C. or higher and 700° C. or lower. When the nickel-manganese composite hydroxide is heated at 105° C. or higher, at least a part of remaining water can be easily removed. Note that, when the temperature for the heat treatment is lower than 105° C., it takes a long time to remove the remaining water, which is not industrially suitable. On the other hand, when the temperature for the heat treatment exceeds 700° C., the particles converted into the nickel-manganese composite oxide may be sintered and aggregated. For example, when most of nickel-manganese composite hydroxide is converted into nickel-manganese composite oxide, the temperature for the heat treatment is preferably 350° C. or higher and 700° C. or lower.

The atmosphere of the heat treatment is not particularly limited, and for example, it is preferable that the heat treatment is performed in an air flow from the viewpoint of easy operation. Furthermore, the time for the heat treatment is not particularly limited and can be set to, for example, 1 hour or longer. When the time for the heat treatment is shorter than 1 hour, remaining water in the particles of nickel-manganese composite hydroxide may not be sufficiently removed. Furthermore, the time for the heat treatment is preferably 5 hours or longer and 15 hours or shorter. Furthermore, the equipment to be used for the heat treatment is not particularly limited, is only required to heat the nickel-manganese composite hydroxide in an air flow, and for example, a fan drying machine and an electric furnace that does not generate gas can be suitably used.

Note that, in FIG. 7(B), the nickel-manganese composite hydroxide after the crystallization process (S1) is subjected to the heat treatment, but the nickel-manganese composite hydroxide obtained in a process other than the crystallization process (S1) may be subjected to the heat treatment. Even in this case, by removing at least a part of moisture in the nickel-manganese composite hydroxide, the aforementioned effect can be obtained.

[Mixture Preparation Process (S10)]

The mixture preparation process (S10) is a process of preparing a mixture containing at least a nickel-manganese composite compound, a lithium compound, and optionally one or both of a titanium compound and a niobium compound. Hereinafter, examples of the mixture preparation process (S10) will be described respectively. Note that, the following description is an example of the mixture preparation process (S10), and in the mixture preparation process (S10), a mixture may be prepared by a method other than the method described below.

As illustrated in FIG. 6, the mixture preparation process (S10A) is a process of mixing at least a nickel-manganese composite compound, a titanium compound, a niobium compound, and a lithium compound to prepare a mixture. Furthermore, in the mixture preparation process (S10), a compound other than the above-described compound may be mixed, and for example, a compound containing the element M may be mixed.

Furthermore, as illustrated in FIG. 8, the mixture preparation process (S10B) is a process of mixing at least a nickel-manganese composite compound containing titanium, a niobium compound, and a lithium compound to prepare a mixture. Note that, in the mixture preparation process (S10B), a compound other than the above-described compound may be mixed, and for example, a titanium compound may be further mixed, or a compound containing the element M may be mixed.

Furthermore, as illustrated in FIG. 11, the mixture preparation process (S10C) is a process of mixing at least a nickel-manganese composite compound containing niobium, a titanium compound, and a lithium compound to prepare a mixture. Note that, in the mixture preparation process (S10C), a compound other than the above-described compound may be mixed, and for example, a niobium compound may be further mixed, or a compound containing the element M may be mixed.

In the mixture preparation process (S10), the respective compounds can be added, for example, as powder (solid phase) and mixed. Hereinafter, respective materials to be used in the mixture preparation process (S10) will be described.

(Nickel-Manganese Composite Compound)

The nickel-manganese composite compound to be used in the mixture preparation process (S10A) contains nickel (Ni), manganese (Mn), and optionally an element M (M) that is at least one element selected from the group consisting of Co, V, Mg, Mo, Ca, Cr, Ta, Na, W, Fe, Zn, B, Si, P, Zr, and Al, as elements other than hydrogen (H) and oxygen (O). Furthermore, the amount of substance ratio of the contained elements is preferably represented as Ni:Mn:M=(1−x−y) x:y (provided that, $0 \leq x \leq 0.30$ and $0 \leq y \leq 0.30$). Furthermore, the nickel-manganese composite compound may be at least one of hydroxide and oxide.

The nickel-manganese composite compound containing titanium to be used in the mixture preparation process (S10B) contains nickel (Ni), manganese (Mn), titanium (Ti), and optionally an element M (M) that is at least one element selected from the group consisting of Co, V, Mg, Mo, Ca, Cr, Zr, Ta, Na, W, Fe, Zn, B, Si, P, and Al, as elements other than hydrogen (H) and oxygen (O). Furthermore, the amount of substance ratio of the contained elements is preferably represented as Ni:Mn:M:Ti=(1−x−y−z'):x:y:z' (provided that, $0 \leq x \leq 0.30$, $0 \leq y \leq 0.30$, and $0.005 \leq z' \leq 0.05$). Furthermore, the nickel-manganese composite compound containing titanium may be at least one of hydroxide and oxide.

The nickel-manganese composite hydroxide containing niobium to be used in the mixture preparation process (S10C) contains nickel (Ni), manganese (Mn), niobium (Nb), and optionally an element M (M) that is at least one element selected from the group consisting of Co, V, Mg, Mo, Ca, Cr, Ta, Na, W, Fe, Zn, B, Si, P, Zr, and Al, as elements other than a hydroxyl group (OH). Furthermore, the amount of substance ratio of the contained elements is preferably represented as Ni:Mn:M:Nb=(1−x−y−w'):x:y:w' (provided that, $0.03 \leq x \leq 0.30$, $0 \leq y \leq 0.30$, and $0.001 < w' \leq 0.03$). Furthermore, the nickel-manganese composite compound containing niobium may be at least one of hydroxide and oxide.

Since the contents (compositions) of the respective elements (Ni, Mn, and M) in the nickel-manganese composite compound are almost maintained also in particles of the lithium-nickel-manganese composite oxide, the content of each of the elements (Ni, Mn, and M) is preferably in the same range as the content in the lithium-nickel-manganese composite oxide described above. Note that, the nickel-manganese composite compound to be used in the present embodiment may contain an element other than the aforementioned elements (Ni, Mn, and M), hydrogen, and oxygen at a small amount in the range that does not impair the effect of the present invention.

As the nickel-manganese composite compound, as described above, the nickel-manganese composite hydroxide obtained by the crystallization process (S1A) or (S1B) may be used, and the nickel-manganese composite hydroxide obtained by the coating process (S3) may be used. Furthermore, at least one of the nickel-manganese composite hydroxide and the nickel-manganese composite oxide obtained after the heat treatment process (S2) may be used. Note that, the nickel-manganese composite compound can be obtained by the aforementioned crystallization process (S1A, S1B) and/or heat treatment process (S2), and the like, but may be obtained by other methods.

Furthermore, it is preferable that, in the nickel-manganese composite compound, each of nickel and manganese is uniformly contained in the particles. For example, when mixtures obtained by separately mixing nickel hydroxide particles and a manganese compound, nickel hydroxide particles coated with a manganese compound, and the like are used as raw materials, the distribution of manganese in a positive electrode active material to be obtained becomes non-uniform, and thus an effect obtained by containing manganese may not be sufficiently obtained.

(Titanium Compound)

As the titanium compound, a known compound containing titanium can be used, and for example, titanium oxide, titanium sulfate, titanium tetrabromide, titanium tetrachloride, titanium silicide, or the like can be used. Note that, the titanium compound may be used singly, or two or more kinds thereof may be used.

Among these, titanium oxide is preferable from the viewpoint of easy availability and of avoiding mixing of impurities into the lithium-nickel-manganese composite oxide. Note that, when impurities are mixed into the lithium-nickel-manganese composite oxide, decreases in thermal stability, battery capacity, and cycle characteristics of the secondary battery obtained may be caused.

The titanium compound is preferably mixed as particles (solid phase). When titanium is added as a solid phase, the particle size of the titanium compound changes the reactivity in the firing process (S20), and thus the particle size of the titanium compound used is one of the important factors. The average particle size of the titanium compound is preferably 0.01 μm or more and 5 μm or less, more preferably 0.05 μm or more and 3 μm or less, and further preferably 0.08 μm or more and 1 μm or less. When the average particle size is smaller than 0.01 μm, problems may arise that it is significantly difficult to handle the powder and the titanium compound scatters and the intended composition cannot be imparted to the active material in the mixture preparation process (S10) and the firing process (S20). On the other hand, when the average particle size is larger than 5 μm, titanium may not be uniformly distributed in the lithium-nickel-manganese composite oxide after firing and a battery capacity may be decreased. Note that, the average particle size is a volume average particle size (Mv) and can be determined from, for example, a volume integrated value measured by a laser light diffraction scattering type particle size distribution analyzer.

The titanium compound may be pulverized in advance so as to have a particle size in the above range by using various pulverizers such as ball mill, planetary ball mill, jet mill/nano jet mill, bead mill, and pin mill. Furthermore, the titanium compound may be classified by a dry classifier or sieving as necessary. For example, particles close to 1 μm can be obtained using a dry classifier.

(Niobium Compound)

As the niobium compound, a known compound containing niobium can be used, for example, niobic acid, niobium oxide, niobium nitrate, niobium pentachloride, and niobium nitrate can be used. Among these, the niobium compound is preferably niobium oxide, niobic acid, or a mixture thereof from the viewpoint of easy availability and of avoiding mixing of impurities into the lithium-nickel-manganese composite oxide. Note that, when impurities are mixed into the lithium-nickel-manganese composite oxide, decreases in thermal stability, battery capacity, and cycle characteristics of the secondary battery obtained may be caused.

The niobium compound is preferably mixed as particles (solid phase). When niobium is added as a solid phase, the particle size of the niobium compound changes the reactivity in the subsequent firing process (step S20), and thus the particle size of the niobium compound used is one of the important factors. The average particle size of the niobium compound is preferably 0.01 μm or more and 20 μm or less, more preferably 0.08 μm or more and 5 μm or less, and further preferably 0.10 μm or more and 3 μm or less. When the average particle size is smaller than 0.01 μm, problems may arise that it is significantly difficult to handle the powder and the niobium compound scatters and the intended composition cannot be imparted to the active material in the mixture preparation process (S10) and the firing process (S20). On the other hand, when the average particle size is larger than 10 μm, Nb may not be uniformly distributed in the lithium-nickel-manganese composite oxide after firing and thermal stability may not be secured. Note that, the average particle size is a volume average particle size (Mv) and can be determined from, for example, a volume integrated value measured by a laser light diffraction scattering type particle size distribution analyzer.

The niobium compound may be pulverized in advance so as to have a particle size in the above range by using various pulverizers such as ball mill, planetary ball mill, jet mill/nano jet mill, bead mill, and pin mill. The niobium compound may be classified by a dry classifier or sieving, if necessary. For example, particles having an average particle size close to 0.05 μm can be obtained using a dry classifier.

(Compound Containing Element M)

As the compound containing the element M, a known compound containing the element M can be used, and for example, cobalt oxide, vanadium pentoxide, magnesium oxide, molybdenum oxide, calcium oxide, calcium carbonate, chromium oxide, tantalum pentoxide, sodium carbonate, tungsten trioxide, iron oxide, zinc oxide, boric acid, boron oxide, silicon oxide, phosphoric acid, zirconium oxide, and the like can be used. Note that, when impurities are mixed into the lithium-nickel-manganese composite oxide, decreases in thermal stability, battery capacity, and cycle characteristics of the secondary battery obtained may be caused.

The element M may be mixed as particles (solid phase) using the compound containing the element M, or may be included in the nickel-manganese composite hydroxide by the aforementioned method. When the compound containing the element M is added as a solid phase, the particle size of the compound containing the element M changes the reactivity in the subsequent firing process (step S20), and thus it is preferable to appropriately adjust the particle size of the compound containing the element M used. Furthermore, when the compound containing the element M is mixed in the mixture preparation process (S10), the compound containing the element M is preferably mixed so that the total amount of substance of the element M contained in the nickel-manganese composite compound and the compound containing the element M is in the amount of substance ratio range of the element M in the lithium-nickel-manganese composite compound described above.

The compound containing the element M may be pulverized in advance so as to have a particle size in the above range by using various pulverizers such as ball mill, planetary ball mill, jet mill/nano jet mill, bead mill, and pin mill. The compound containing the element M may be classified by a dry classifier or sieving, if necessary.

(Lithium Compound)

The lithium compound is not particularly limited, and a known compound containing lithium can be used, and for example, lithium carbonate, lithium hydroxide, lithium nitrate, or a mixture thereof is used. Among these, lithium carbonate, lithium hydroxide, or a mixture thereof is preferable from the viewpoint of being less affected by remaining impurities and melting at the firing temperature.

(Mixing Method)

The method for mixing the compound is not particularly limited, and these particles may be sufficiently mixed to the extent to which the shapes of these particles are not destroyed. As the mixing method, for example, mixing can be performed using a general mixer, and for example, mixing can be performed using a shaker mixer, a Loedige mixer, a Julia mixer, a V blender, and the like. Note that, it is preferable to sufficiently mix the titanium mixture before the firing process to be described later. When mixing is not sufficiently performed, Li/Me which is the amount of substance ratio (atomic % ratio) of Li to the metal elements (Me: Me=Ni+Mn+the element M+Ti+Nb in the present embodiment) other than Li may vary between the individual particles of the positive electrode active material and problems may arise that sufficient battery characteristics are not attained.

When the water-washing process (S30) described below is not performed, the lithium compound is mixed so that Li/Me in the mixture is 0.97 or more and 1.25 or less. In other words, the lithium compound is mixed so that Li/Me in the mixture is the same as Li/Me in the positive electrode active material obtained. This is because Li/Me in the mixture in the mixture preparation process (S10) becomes Li/Me in the positive electrode active material since Li/Me and the molar ratio of the respective metal elements do not change before and after the firing process (S20).

Furthermore, when the water-washing process (S30) is performed, since a part of the excessive lithium component existing on the surface of the lithium-nickel composite oxide is dissolved in water, the Li/Me ratio may be further decreased than the lithium-nickel composite oxide obtained after the firing process (S20). The decrease range of the Li/Me ratio varies according to the composition and physical properties of the lithium-nickel composite oxide and water-washing conditions, but in an example of the production method according to the present embodiment, the Li/Me ratio is decreased by approximately 0.02 by the water-washing process (S30).

Furthermore, in the mixture, the mixing amount of the titanium compound and the niobium compound is adjusted so that the amount of substance ratio (z) of titanium and the amount of substance ratio (w) of niobium to the total amount of substance of the metal elements (Ni, Mn, the element M, Ti, and Nb) excluding lithium satisfy $0.005 \leq z \leq 0.05$, $0.001 < w \leq 0.03$, $(z+w) \leq 0.06$, and $z > w$. Furthermore, the amount of substance ratio (c) of niobium in the mixture may be $0.002 \leq c \leq 0.03$.

Note that, the content (ratio) of niobium (Nb) and titanium (Ti) in the mixture is almost maintained even in the lithium-nickel-manganese composite oxide. Thus, the mixing amount of the niobium compound and the titanium compound in the mixture preparation process (S10A) is preferably in the same range as the content of niobium and titanium in the lithium-nickel-manganese composite oxide described above.

Further, the amount of substance of titanium contained in the entire mixture in the mixture preparation process (S10B) may be the same as the amount of substance of titanium contained in the nickel-manganese composite compound containing titanium. Furthermore, when a titanium compound is further mixed in the mixture preparation process (S10B), the amount of substance of titanium contained in the entire mixture may be the same as the total amount of substance of titanium contained in the nickel-manganese composite compound containing titanium and the titanium compound to be mixed.

Further, the amount of substance of niobium contained in the entire mixture in the mixture preparation process (S10C) may be the same as the amount of substance of niobium contained in the nickel-manganese composite compound containing niobium. Furthermore, when a niobium compound is further mixed in the mixture preparation process (S10C), the amount of substance of niobium contained in the entire mixture may be the same as the total amount of substance of niobium contained in the nickel-manganese composite compound containing niobium and the niobium compound to be mixed.

[Firing Process (S20)]

The firing process (S20) is a process of firing the mixture obtained by the mixture preparation process (S10) to obtain lithium-nickel-manganese composite oxide.

When the mixture is fired, lithium in the lithium compound is diffused in the nickel-manganese composite compound, and thereby the lithium-nickel-manganese composite oxide configured by polycrystal structure particles is formed. The lithium compound melts at a temperature when firing and penetrates into the nickel-manganese composite compound to form a lithium-nickel-manganese composite oxide. At this time, it is considered that niobium and titanium contained in the lithium mixture are also penetrate into the inside of the secondary particle along with the melt lithium compound, and also in the primary particles, they penetrate when there is a crystal grain boundary or the like.

As for the firing atmosphere, the oxygen concentration is preferably 80 vol % or more and 100 vol % or less, and the oxygen concentration is more preferably 90 vol % or more and 100 vol % or less. In the lithium-nickel-manganese composite oxide having a high nickel ratio, so-called cationic mixing in which a transition metal element such as Ni is arranged in the Li site in the layered compound is likely to occur. Furthermore, the crystallinity of the layered compound is decreased, and the disarrangement of atomic distribution is likely to occur. Due to the disarrangement of these structures, titanium or the like cannot be uniformly solid-solved at the Me site (transition metal element site), and thus it is considered that a battery capacity is decreased. On the other hand, when firing is performed in the above oxygen concentration range, it is possible to obtain a positive electrode active material in which thermal stability is improved while a high battery capacity is maintained and both of a high battery capacity and thermal stability are achieved.

The firing temperature in an oxidizing atmosphere is 750° C. or higher and 1000° C. or lower, preferably 750° C. or higher and 950° C. or lower. When firing is performed at the above temperature, melting of the lithium compound occurs to promote the penetration and diffusion of titanium. Furthermore, the mixture contains manganese so that the firing temperature can be rised. The firing temperature can be appropriately adjusted within the above range, and by rising the firing temperature, diffusion of titanium and niobium is promoted. Further, the crystallinity of the lithium-nickel-manganese composite oxide is increased, and thus a battery capacity can be further improved.

On the other hand, when the firing temperature is lower than 750° C., diffusion of lithium, titanium, and manganese into the nickel-manganese composite compound is not sufficiently performed, excessive lithium or unreacted particles may remain or the crystal structure may not be sufficiently arranged, so that a problem arises in that sufficient battery characteristics are not obtained. Furthermore, when the firing temperature exceeds 1000° C., there is the possibility that sintering violently occurs between the particles of the formed lithium-nickel-manganese composite oxide and abnormal grain growth occurs. When abnormal particle growth occurs, the particles may be too coarse after firing so as to decrease a filling property when the positive electrode active material is formed, and further, problems arise in that the reaction resistance due to the disarrangement of the crystal structure is increased and a discharge capacity decreases.

The firing time is set to preferably at least 3 hours or longer and more preferably 6 hours or longer and 24 hours or shorter. When the firing time is shorter than 3 hours, the lithium-nickel-manganese composite oxide may not be sufficiently generated. Furthermore, a furnace used for firing is not particularly limited as long as a titanium mixture can be fired in an oxygen flow, an electric furnace without gas generation is preferably used, and either of a batch-type furnace or a continuous furnace can be used.

[Volume Resistivity when Compressed to 4.0 g/Cm$^3$]

The lithium-nickel-manganese composite oxide obtained after firing has a volume resistivity when compressed to 4.0 g/cm$^3$ of $5.0 \times 10^2$ Ω·cm or more and $1.0 \times 10^5$ Ω·cm or less, preferably $1.0 \times 10^3$ Ω·cm or more and $1.0 \times 10^4$ Ω·cm or less, and more preferably $2.0 \times 10^3$ Ω·cm or more and $1.0 \times 10^4$ Ω·cm or less. When the volume resistivity of the lithium-nickel-manganese composite oxide is in the above range, high thermal stability during short circuit can be obtained.

Note that, the volume resistivity can be determined, for example, by weighing the positive electrode active material within a range of 4.5 g or more and 5.5 g or less, pressure-molding the positive electrode active material into a cylindrical shape having a diameter of 20 mm to 4.0 g/cm$^3$, and then performing measurement in a pressurized state by a resistivity test method using a four-probe method in accordance with JIS K 7194: 1994.

[Calcination]

Note that, the firing process (S20) may further include a process of performing calcination at a temperature lower than the firing temperature before firing at a temperature of 750° C. or higher and 1000° C. or lower. The calcination is preferably performed at a temperature at which the lithium compound in the mixture may be melt and may react with the nickel-manganese composite compound. The temperature for calcination can be set, for example, to 350° C. or higher, and can be set to a temperature lower than the firing temperature. Furthermore, the lower limit of the temperature for calcination is preferably 400° C. or higher. When the mixture is held (calcined) in the above temperature range, the lithium compound penetrates in the nickel-manganese composite compound, the diffusion of lithium is sufficiently performed, and thus a uniform lithium-nickel-manganese composite oxide can be obtained. For example, when lithium hydroxide is used as the lithium compound, it is preferable to perform calcination while holding the lithium-titanium mixture at a temperature of 400° C. or higher and 550° C. or lower for 1 hour or longer and about 10 hours.

[Crushing]

Note that, in the lithium-nickel-manganese composite oxide obtained after the firing process (S20), sintering between particles is suppressed but coarse particles may be formed by weak sintering and aggregation. In such a case, the particle size distribution can be adjusted by eliminating the sintering and aggregation by crushing.

Furthermore, the production method according to the present embodiment may include a water-washing process (S30) and a drying process (S40) after the firing process (S20) as described below. By providing these processes, a discharge capacity can be improved, and thus both of high thermal stability and a higher battery capacity can be achieved. Hereinafter, the respective processes will be described.

[Water-Washing Process (S30)]

The water-washing process (S30) is a process of mixing the lithium-nickel-manganese composite oxide obtained in the firing process (S20) and water and stirring the mixture (hereinafter, referred to as "stirring with water") so as to perform solid-liquid separation.

The production method according to the present embodiment includes the water-washing process (S30) and the drying process (S40) to be described below, and thereby the crystallinity of the positive electrode active material and a discharge capacity are improved to improve. Although the details thereof are not clear, for example, it is considered that when lithium in the positive electrode active material is pulled out by stirring with water, the disorder of atomic arrangement is alleviated so that the crystallinity of the positive electrode active material is improved and a high discharge capacity is exhibited. Furthermore, by the water-washing process (S30), an excessive lithium component on the surface is dissolved in water to be removed, and thereby the gelling of a positive electrode mixture paste at the time of producing an electrode plate of a secondary battery can be suppressed.

The amount of water to be mixed in the water-washing process (S30) is preferably 50 parts by mass or more and 200 parts by mass or less with respect to 150 parts by mass of the lithium-nickel-manganese composite oxide. When the mixing ratio of water is 200 parts by mass or more, an excessive amount of lithium is pulled out from the positive electrode active material, so that a decrease in a battery capacity or an increase in reaction resistance may occur. On the other hand, when the mixing ratio of water is less than 50 parts by mass, there is the possibility that the effect of improving crystallinity or removal of excessive lithium components is insufficient, so that a decrease in battery capacity or the gelling of the positive electrode mixture paste occurs. Furthermore, the amount of water to be mixed in the water-washing process (S30) may be 50 parts by mass or more and 200 parts by mass or less with respect to 100 parts by mass of the lithium-nickel-manganese composite oxide.

The time for water-washing is not particularly limited, and for example, is about 1 minute or longer and 2 hours or shorter, and may be 5 minutes or longer and 50 minutes or shorter.

After the lithium-nickel-manganese composite oxide is stirred with water, solid-liquid separation is performed to obtain a lithium-nickel-manganese composite oxide (precipitate). A solid-liquid separation method is not particularly limited, and a known method can be used. For example, solid-liquid separation can be used using one or more kinds selected from a suction filter such as a Nutsche (a Buchner funnel), a filter press, a centrifugal separator, and the like.

[Drying Process (S40)]

The drying process (S40) is a process of drying the lithium-nickel-manganese composite oxide (precipitate) obtained by the water-washing process (S30) to obtain powder (dry powder) of the lithium-metal composite oxide.

Regarding drying conditions, heat treatment is preferably performed in an oxidizing atmosphere or in a vacuum atmosphere at a temperature of 100° C. or higher and 250° C. or lower. When the drying temperature is 100° C. or higher, moisture in the precipitate can be sufficiently evaporated. Furthermore, when the drying temperature is 250° C. or lower, a compact drying apparatus can be used, which is suitable for industrial-scale implementation.

An atmosphere when drying is preferably an atmosphere not containing water vapor or carbon dioxide, and specifically, an oxidizing atmosphere such as an oxygen atmosphere or a vacuum atmosphere is preferable in order to avoid a reaction between moisture or carbonic acid in the atmosphere and a positive electrode active material to be obtained. Furthermore, from the viewpoint that water vapor generated by drying can be rapidly discharged, it is preferable to attach an exhaust system to a drying apparatus.

The drying time is not particularly limited, but in order to sufficiently evaporate moisture of a raw material mixture, the drying time at the maximum attained temperature when drying is set to preferably 0.5 hours or longer. Furthermore, the upper limit of the drying time is set to preferably 48 hours or shorter from the viewpoint of productivity.

3. Lithium Ion Secondary Battery

The lithium ion secondary battery (hereinafter, also referred to as "secondary battery") according to the present embodiment includes a positive electrode containing the positive electrode active material described above, a negative electrode, and a non-aqueous electrolyte. The secondary battery includes, for example, a positive electrode, a negative electrode, and a non-aqueous electrolyte solution. Furthermore, the secondary battery may include, for example, a positive electrode, a negative electrode, and a solid electrolyte. Furthermore, the secondary battery may be any secondary battery which is charged and discharged by de-insertion and insertion of lithium ions and may be, for example, a non-aqueous electrolyte solution secondary battery or an all-solid-state lithium secondary battery. Note that, the embodiment described below is merely an example, and the secondary battery according to the present embodiment can also be applied to forms subjected to various modifications and improvements based on the embodiment described here.

[Positive Electrode]

A positive electrode of a secondary battery is prepared using the positive electrode active material described above. An example of a method for producing the positive electrode will be described below.

First, the above positive electrode active material, a conductive material, and a binding agent are mixed, activated carbon and a solvent for viscosity adjustment or the like are further added as necessary, and the resulting mixture is kneaded to prepare a positive electrode mixture paste. At this time, a mixing ratio among the components of the positive electrode mixture paste can be appropriately adjusted according to performance of an intended secondary battery. For example, when the solid content of the positive electrode mixture excluding a solvent is regarded as 100 parts by mass, the content of the positive electrode active material may be 60 parts by mass or more and 95 parts by mass or less, the content of the conductive material may be 1 part by mass or more and 20 parts by mass or less, and the content of the binding agent may be 1 part by mass or more and 20 parts by mass or less.

The obtained positive electrode mixture paste is applied to, for example, a surface of an aluminum foil current collector and dried to scatter the solvent, and a sheet-like positive electrode is thereby prepared. Pressurization may be performed by roll press or the like in order to increase an electrode density as necessary. The sheet-like positive electrode thus obtained can be cut into a proper size according to an intended battery and used in preparation of a battery. However, a method for preparing the positive electrode is not limited to the above-exemplified method, and other methods may be used.

As the conductive material, for example, graphite (natural graphite, artificial graphite, expanded graphite, and the like), and a carbon black-based material such as acetylene black or ketjen black can be used.

The binding agent (binder) plays a role of connecting active material particles together, and for example, polyvinylidene fluoride (PVDF), polytetrafluoroethylene (PTFE), fluororubber, ethylene propylene diene rubber, styrene butadiene, a cellulose-based resin, polyacrylic acid, and the like can be used.

A solvent which disperses the positive electrode active material, the conductive material, and the activated carbon and dissolves the binding agent is added to the positive electrode mixture as necessary. As the solvent, specifically, an organic solvent such as N-methyl-2-pyrrolidone can be used. Furthermore, the activated carbon can be added to the positive electrode mixture in order to increase electric double layer capacity.

[Negative Electrode]

As the negative electrode, metal lithium, a lithium alloy, and the like may be used. Furthermore, as the negative electrode, a negative electrode may be used which is formed by mixing a binding agent with a negative electrode active material which can insert and de-insert lithium ions, adding an appropriate solvent thereto to form a paste-like negative electrode mixture, coating a surface of a metal foil current collector such as copper with the paste-like negative electrode mixture, drying the coated metal foil current collector, and compressing the resultant metal foil current collector in order to increase an electrode density as necessary.

Examples of the negative electrode active material include natural graphite, artificial graphite, a fired organic compound such as a phenol resin, and a powdery carbon material such as coke. In this case, as a negative electrode binding agent, a fluorine-containing resin such as PVDF can be used as in the positive electrode, and as a solvent for dispersing the active material and the binding agent, an organic solvent such as N-methyl-2-pyrrolidone can be used.

[Separator]

A separator is disposed by being interposed between the positive electrode and the negative electrode. The separator separates the positive electrode and the negative electrode from each other and retains the electrolyte, a known separator can be used, and for example, a thin film such as polyethylene or polypropylene having a large number of minute pores can be used.

[Non-Aqueous Electrolyte]

As the non-aqueous electrolyte, for example, a non-aqueous electrolyte solution can be used. The non-aqueous electrolyte solution is obtained by dissolving a lithium salt as a supporting salt in an organic solvent. Furthermore, as the non-aqueous electrolyte solution, a solution obtained by dissolving a lithium salt in an ionic liquid may be used. Note that, the ionic liquid refers to a salt including a cation other than a lithium ion and an anion, and being in a liquid state even at room temperature.

As the organic solvent, one selected from the group consisting of cyclic carbonates such as ethylene carbonate, propylene carbonate, butylene carbonate, and trifluoropropylene carbonate, chain carbonates such as diethyl carbonate, dimethyl carbonate, ethyl methyl carbonate, and dipropyl carbonate, further, ether compounds such as tetrahydrofuran, 2-methyltetrahydrofuran, and dimethoxyethane, sulfur compounds such as ethyl methyl sulfone and butane sultone, and phosphorus compounds such as triethyl phosphate and trioctyl phosphate can be used singly, or two or more of these can be used in mixture.

As the supporting salt, $LiPF_6$, $LiBF_4$, $LiClO_4$, $LiAsF_6$, $LiN(CF_3SO_2)_2$, a composite salt thereof, and the like can be used. Further, the non-aqueous electrolyte solution may contain a radical scavenger, a surfactant, a flame retardant, and the like.

Furthermore, as the non-aqueous electrolyte, a solid electrolyte may be used. The solid electrolyte has a property capable of withstanding a high voltage. Examples of the solid electrolyte include an inorganic solid electrolyte and an organic solid electrolyte.

Examples of the inorganic solid electrolyte include an oxide-based solid electrolyte and a sulfide solid electrolyte.

The oxide-based solid electrolyte is not particularly limited, and for example, one that contains oxygen (O) and exhibits lithium ion conductivity and electron insulating property can be suitably used. As the oxide-based solid electrolyte, for example, one or more selected from the group consisting of lithium phosphate ($Li_3PO_4$), $Li_3PO_4N_X$, $LiBO_2N_X$, $LiNbO_3$, $LiTaO_3$, $Li_2SiO_3$, $Li_4SiO_4$—$Li_3PO_4$, $Li_4SiO_4$—$Li_2O$—$B_2O_3$—$P_2O_5$, $Li_2O$—$SaO_2$, $Li_2O$—$B_2O_3$—$ZnO$, $Li_{1+x}Al_xTi_{2-x}(PO_4)_3$ (0≤X≤1), $Li_{1+x}Al_xGe_{2-x}(PO_4)_3$ (0≤X≤1) $LiTi_2(PO_4)_3$, $Li_{3x}La_{2/3-x}TiO_3$ (0≤X≤⅔), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$ can be used.

The sulfide solid electrolyte is not particularly limited, and for example, one that contains sulfur (S) and exhibits lithium ion conductivity and electron insulating property can be suitably used. As the sulfide solid electrolyte, for example, one or more selected from the group consisting of $Li_2S$—$P_2S_5$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4Li_2S$—$SiS_2$, $LiPO_4$—$Li_2S$—$SiS$, $LiI$—$Li_2S$—$P_2O_5$, and $LiI$—$Li_3PO_4$—$P_2S_5$ can be used.

Note that, as the inorganic solid electrolyte, an inorganic solid electrolyte other than those described above may be used, and for example, $Li_3N$, $LiI$, $Li_3N$—$LiI$—$LiOH$, and the like may be used.

The organic solid electrolyte is not particularly limited as long as it is a polymer compound exhibiting ionic conductivity, and for example, polyethylene oxide, polypropylene oxide, and copolymers of these can be used. Furthermore, the organic solid electrolyte may contain a supporting salt (lithium salt).

Note that, it is also possible to constitute a secondary battery by using a solid electrolyte instead of the non-aqueous electrolyte solution. The solid electrolyte is not decomposed even at a high potential, therefore does not cause gas generation or thermal runaway due to decomposition of the electrolyte solution at the time of charge, as observed in a non-aqueous electrolyte solution, and thus exhibits high thermal stability. For this reason, when the positive electrode active material according to the present invention is used for a lithium ion secondary battery, a secondary battery exhibiting higher thermal stability can be obtained.

[Shape and Configuration of Secondary Battery]

The configuration of the secondary battery is not particularly limited, and as described above, the secondary battery may include a positive electrode, a negative electrode, a separator, a non-aqueous electrolyte, and the like, or may include a positive electrode, a negative electrode, a solid electrolyte, and the like. Furthermore, the shape of the secondary battery is not particularly limited, and the secondary battery can be formed into various shapes such as a cylindrical shape and a laminated shape.

For example, when the secondary battery is a non-aqueous electrolyte solution secondary battery, a positive electrode and a negative electrode are laminated with a separator interposed therebetween to form an electrode body, the obtained electrode body is impregnated with a non-aqueous electrolyte solution, a positive electrode collector is connected to a positive electrode terminal communicating with the outside using a current collecting lead or the like, a negative electrode collector is connected to a negative electrode terminal communicating with the outside using a current collecting lead or the like, and the resulting product is sealed in a battery case to complete the secondary battery.

Note that, the secondary battery according to the present embodiment is not limited to a form in which a non-aqueous electrolyte solution is used as a non-aqueous electrolyte but can be formed into, for example, a secondary battery using a solid non-aqueous electrolyte, that is, an all-solid-state battery. When the secondary battery according to the present embodiment is formed into the all-solid-state battery, the components other than the positive electrode active material can be changed as necessary.

The secondary battery according to the present embodiment can achieve high thermal stability at low cost. Furthermore, the positive electrode active material to be used for the secondary battery can be obtained by the industrial production method as described above. Furthermore, the secondary battery is suitable for a power source of a small portable electronic device (such as a notebook personal computer or a mobile phone terminal) that is required to have a high capacity all the time. Furthermore, the secondary battery is superior not only in capacity but also in durability and thermal stability at the time of overcharge to a battery fabricated using a conventional positive electrode active material of a lithium-cobalt-based oxide or lithium-nickel-based oxide. Hence, the secondary battery is suitably used as a power source for electric cars that are restricted in a mounting space since miniaturization and capacity enlargement thereof are possible. Note that, the secondary battery can be used not only as a power source for an electric car driven purely by electric energy but also as a power source for a so-called hybrid car used together with a combustion engine such as a gasoline engine or a diesel engine.

EXAMPLES

Hereinafter, the present invention will be described in more detail with reference to Examples and Comparative Examples of the present invention, but the present invention is not limited to these Examples at all. Note that, methods for analyzing metals contained in positive electrode active materials and various methods for evaluating the positive electrode active materials in Examples and Comparative Examples are as follows.

(1) Analysis of composition: Measured by ICP emission spectrometry.

(2) Volume average particle size (Mv) and particle size distribution width [(D90−D10)/average volume particle size]: Performed on a volume basis by a laser diffraction scattering type particle size analyzer (Microtrac HRA manufactured by Nikkiso Co., Ltd.).

(3) Concentration of each element

The positive electrode active material was manufactured so that cross section analysis of primary particles by S-TEM was possible. Twenty primary particles were arbitrarily selected from a plurality of secondary particles contained in the positive electrode active material, and the compositions in a region (130 nm×130 nm) including cross sections and grain boundaries of individual primary particles were subjected to point analysis by EDX of S-TEM.

(4) Volume resistivity: 5 g of a positive electrode active material was pressure-molded into a cylindrical shape having a diameter of 20 mm so as to be 4.0 g/cm$^3$, and then the volume resistivity was measured and determined in a pressurized state by a resistivity test method using a four-probe method in accordance with JIS K 7194: 1994.

(5) Eluted lithium amount:

2 g of the positive electrode active material was fractionated and put into 125 ml of pure water at room temperature stirred with a stirrer, and titration was performed using an HCl aqueous solution having a concentration of 1 mol/L immediately after the active material was put thereinto. The titration was executed under the following conditions using an automatic titrator COM-1750 (manufactured by HIRANUMA Co., Ltd.).

End point detection method: Inflection point detection
Detection sensitivity: 2500
Burette model No.: H-1700
Burette speed: 2
Minimum dropping rate: 0.013 mL The titration result was evaluated by the Warder method, lithium hydroxide (LiOH) and lithium carbonate ($Li_2CO_3$) were calculated, and the sum of these lithium amounts was calculated as eluted lithium.

Figure 16:
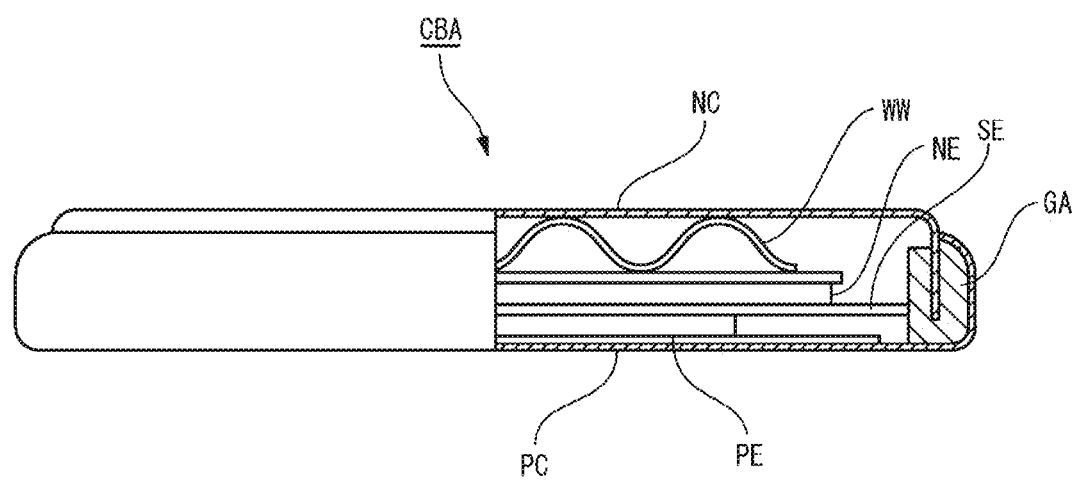
FIG. 16 is a schematic cross-sectional view of a coin-type battery used for battery evaluation.

(6) Initial discharge capacity:

With regard to the initial charge capacity and the initial discharge capacity, a coin-type battery CBA illustrated in FIG. 16 was produced by the following method and then left to stand for about 24 hours to stabilize the open circuit voltage (OCV), then the battery was charged to a cutoff voltage of 4.3 V at a current density of 0.1 mA/cm$^2$ with respect to the positive electrode to take the capacity at this time as the initial charge capacity, the battery paused for one hour and was then discharged to a cutoff voltage of 3.0 V, and the capacity at this time was taken as initial discharge capacity. A multi-channel voltage/current generator (R6741A manufactured by Advantest Corporation) was used to measure the discharge capacity.

(Production of Coin-Type Battery)

52.5 mg of the obtained positive electrode active material, 15 mg of acetylene black, and 7.5 mg of polytetrafluoroethylene resin (PTFE) were mixed and press-molded so as to have a diameter of 11 mm and a thickness of 100 μm at a pressure of 100 MPa, thus manufacturing a positive electrode (electrode for evaluation) PE illustrated in FIG. 16. The manufactured positive electrode PE was dried in a vacuum dryer at 120° C. for 12 hours. Thereafter, using this positive electrode PE, a 2032 type coin-type battery CBA was manufactured in a glove box in an Ar atmosphere with a dew point controlled at −80° C. As a negative electrode NE, lithium (Li) metal having a diameter of 17 mm and a thickness of 1 mm was used. As an electrolyte solution, an equal volume mixed solution (manufactured by Toyama Pharmaceutical Co., Ltd.) of ethylene carbonate (EC) and diethyl carbonate (DEC) containing 1 M $LiClO_4$ as a supporting electrolyte was used. As the separator SE, a polyethylene porous film having a thickness of 25 μm was used. Furthermore, the coin-type battery CBA was assembled into a coin-type battery by disposing a gasket GA and a wave washer WW and using a positive electrode can PC and a negative electrode can NC.

(7) Maximum oxygen generation peak temperature

The thermal stability of the positive electrode was evaluated by quantitatively determining the amount of oxygen released when the positive electrode active material in an overcharged state was heated. A coin-type battery was produced in a similar manner to (6) and subjected to CC charge (constant current-constant voltage charge) at a 0.05 C rate up to a cutoff voltage of 4.3 V. Thereafter, the coin-type battery was disassembled, only the positive electrode was carefully taken out so as not to cause a short circuit, washed with dimethyl carbonate (DMC), and dried. About 2 mg of the dried positive electrode was weighed and heated from room temperature to 450° C. at a temperature rising rate of 10° C./min using a gas chromatograph mass spectrometer (GCMS, QP-2010plus manufactured by SHIMADZU CORPORATION). Helium was used as the carrier gas. The generation behaviors of oxygen (m/z=32) generated when heating were measured to obtain the maximum oxygen generation peak temperature.

Example 1A

[Crystallization Process]

A predetermined amount of pure water was put into the reaction tank (60 L), and the temperature inside the tank was set to 49° C. while stirring the water. At this time, $N_2$ gas was allowed to flow into the reaction tank so that the dissolved oxygen concentration in the reaction tank liquid was 0.8 mg/L. A 2.0 M mixed aqueous solution obtained by blending nickel sulfate, manganese sulfate, and cobalt sulfate so that the molar ratio among nickel:manganese:cobalt was 85:10:5, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 12.0 to 12.6, and the ammonia concentration was adjusted to 10 to 14 g/L. After the reaction tank was stabilized, a slurry containing nickel-manganese-cobalt composite hydroxide was collected through the overflow port and filtered to obtain a cake of nickel-manganese-cobalt composite hydroxide. Impurities were washed by allowing 1 L of pure water to pass through 140 g of nickel-manganese-cobalt composite hydroxide in the Denver used for filtration. The filtered powder was dried to obtain particles of nickel-manganese-cobalt composite hydroxide in which an amount of substance ratio of nickel, manganese, and cobalt is represented as Ni:Mn:Co=0.85:0.10:0.05.

[Mixture Preparation Process]

The obtained particles of nickel-manganese-cobalt composite hydroxide, lithium hydroxide, titanium oxide ($TiO_2$), and niobic acid ($Nb_2O_5 \cdot 4H_2O$) were weighed so that the amount of substance ratio of lithium:(nickel+manganese+cobalt):titanium:niobium was 1.01:0.973:0.022:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was fired at 850° C. for 10 hours in an oxygen (oxygen concentration: 90% by volume) flow, and then was crushed to obtain particles of lithium-nickel-manganese-cobalt composite oxide (positive electrode active material).

[Evaluation]

The production conditions of the positive electrode active material is presented in Table 1, and results of evaluating the positive electrode active material thus obtained by the above evaluation method are presented in Table 2. Note that, the amount of substance ratio of each element in the following table indicates a numerical value obtained by rounding off the fourth decimal place of the measured value, and the Ti/Nb amount of substance ratio indicates a numerical value obtained by rounding off the second decimal place of the ratio calculated from the measured value of the amount of substance ratio of Ti and Nb.

Example 2A

A positive electrode active material was obtained and evaluated in a similar manner to Example 1A, except that the firing temperature in the firing process was set to 870° C. The production conditions and evaluation results of the positive electrode active material are presented in Tables 1 and 2.

Example 3A

A positive electrode active material was obtained and evaluated in a similar manner to Example 1A, except that the firing temperature in the firing process was set to 890° C. The production conditions and evaluation results of the positive electrode active material are presented in Tables 1 and 2.

Example 4A

A positive electrode active material was obtained and evaluated in a similar manner to Example 2A, except that in the mixture preparation process, the obtained particles of nickel-manganese-cobalt composite hydroxide, lithium hydroxide, titanium oxide ($TiO_2$), and niobic acid ($Nb_2O_5 \cdot 4H_2O$) were weighed so that the amount of substance ratio of lithium:(nickel+manganese+cobalt):titanium:niobium was 1.02:0.975:0.022:0.003. The production conditions and evaluation results of the positive electrode active material are presented in Tables 1 and 2.

Example 5A

A positive electrode active material was obtained and evaluated in a similar manner to Example 2A, except that in the mixture preparation process, niobium oxide ($Nb_2O_5$) was used as a niobium compound. The production conditions and evaluation results of the positive electrode active material are presented in Tables 1 and 2.

Example 6A

A positive electrode active material was obtained and evaluated in a similar manner to Example 2A, except that in the firing process, firing was performed in an oxygen (oxygen concentration: 60% by volume) flow. The production conditions and evaluation results of the positive electrode active material are presented in Tables 1 and 2.

Comparative Example 1A

A positive electrode active material was obtained and evaluated in a similar manner to Example 1A, except that in the mixture preparation process, a titanium compound and a niobium compound were not prepared, the obtained particles of nickel-manganese-cobalt composite hydroxide and lithium hydroxide were weighed so that the amount of substance ratio of lithium:nickel:manganese:cobalt was 1.02:0.85:0.10:0.05, and the firing temperature in the firing process was set to 800° C. The production conditions and evaluation results of the positive electrode active material are presented in Tables 1 and 2.

Comparative Example 2A

A positive electrode active material was obtained and evaluated in a similar manner to Example 1A, except that in the mixture preparation process, a niobium compound was not prepared, the obtained particles of nickel-manganese-cobalt composite hydroxide, lithium hydroxide, and titanium oxide ($TiO_2$) were weighed so that the amount of substance ratio of lithium:(nickel+manganese+cobalt):titanium was 1.02:0.974:0.026, and the firing temperature in the firing process was set to 830° C. The production conditions and evaluation results of the positive electrode active material are presented in Tables 1 and 2.

Comparative Example 3A

A positive electrode active material was obtained and evaluated in a similar manner to Example 1A, except that in the mixture preparation process, a titanium compound was not prepared, the obtained particles of nickel-manganese-cobalt composite hydroxide, lithium hydroxide, and niobic acid ($Nb_2O_5 \cdot 4H_2O$) were weighed so that the amount of substance ratio of lithium:(nickel+manganese+cobalt):niobium was 1.02:0.99:0.010, and the firing temperature in the firing process was set to 850° C. The production conditions and evaluation results of the positive electrode active material are presented in Tables 1 and 2.

Comparative Example 4A

A positive electrode active material was obtained and evaluated in a similar manner to Example 1A, except that in the mixture preparation process, the obtained particles of nickel-manganese-cobalt composite hydroxide, lithium hydroxide, titanium oxide ($TiO_2$), and niobic acid ($Nb_2O_5 \cdot 4H_2O$) were weighed so that the amount of substance ratio of lithium:(nickel+manganese+cobalt):titanium:niobium was 1.01:0.977:0.022:0.001, and the firing temperature in the firing process was set to 840° C. The production conditions and evaluation results of the positive electrode active material are presented in Tables 1 and 2.

TABLE 1

| | Mixing process | | Firing process | |
| --- | --- | --- | --- | --- |
| | Titanium compound | Niobium compound | Oxygen concentration vol. % | Firing temperature ° C. |
| Example 1A | $TiO_2$ | $Nb_2O_5 \cdot 4H_2O$ | 90 | 850 |
| Example 2A | $TiO_2$ | $Nb_2O_5 \cdot 4H_2O$ | 90 | 870 |
| Example 3A | $TiO_2$ | $Nb_2O_5 \cdot 4H_2O$ | 90 | 890 |
| Example 4A | $TiO_2$ | $Nb_2O_5 \cdot 4H_2O$ | 90 | 870 |
| Example 5A | $TiO_2$ | $Nb_2O_5$ | 90 | 870 |
| Example 6A | $TiO_2$ | $Nb_2O_5 \cdot 4H_2O$ | 60 | 870 |
| Comparative Example 1A | — | — | 90 | 800 |
| Comparative Example 2A | $TiO_2$ | — | 90 | 830 |
| Comparative Example 3A | — | $Nb_2O_5 \cdot 4H_2O$ | 90 | 850 |
| Comparative Example 4A | $TiO_2$ | $Nb_2O_5 \cdot 4H_2O$ | 90 | 840 |

TABLE 2

| | Positive electrode active material | | | | | | | | | | | Evaluation | |
| --- | --- | --- | --- | --- | --- | --- | --- | --- | --- | --- | --- | --- | --- |
| | Amount of substance ratio | | | | | | Ti/Nb amount of substance ratio | Grain boundary/ intraparticle Nb concentration | Volume average particle size MV μm | Particle size distribution width | Volume resistivity* Ω · cm | Discharge capacity mAh/g | Maximum oxygen generation peak temperature ° C. |
| | Li a | Ni 1 - x - y - x - w | Mo x | Co(M) y | Ti z | Nb w | | | | | | | |
| Example 1A | 1.01 | 0.828 | 0.096 | 0.050 | 0.022 | 0.005 | 4.9 | 1.5 | 14.7 | 0.96 | $3.0 \times 10^3$ | 184 | 266 |
| Example 2A | 1.01 | 0.828 | 0.096 | 0.050 | 0.022 | 0.005 | 4.6 | 1.6 | 14.2 | 0.96 | $3.4 \times 10^3$ | 191 | 264 |
| Example 3A | 1.01 | 0.827 | 0.101 | 0.045 | 0.022 | 0.005 | 4.8 | 1.6 | 13.7 | 0.95 | $4.2 \times 10^5$ | 192 | 270 |
| Example 4A | 1.02 | 0.830 | 0.096 | 0.050 | 0.022 | 0.003 | 7.8 | 1.5 | 16.5 | 0.98 | $1.0 \times 10^3$ | 198 | 252 |
| Example 5A | 1.01 | 0.829 | 0.096 | 0.048 | 0.022 | 0.005 | 4.4 | 1.6 | 14.6 | 0.95 | $2.9 \times 10^3$ | 190 | 265 |
| Example 6A | 1.01 | 0.828 | 0.096 | 0.05 | 0.022 | 0.005 | 4.4 | 1.5 | 16.3 | 0.96 | $2.5 \times 10^3$ | 164 | 267 |
| Comparative Example 1A | 1.02 | 0.852 | 0.098 | 0.050 | — | — | — | — | 13.9 | 0.87 | $8.8 \times 10$ | 211 | 217 |
| Comparative Example 2A | 1.02 | 0.830 | 0.096 | 0.048 | 0.026 | — | — | — | 15.6 | 0.87 | $1.8 \times 10^2$ | 191 | 225 |
| Comparative Example 3A | 1.00 | 0.844 | 0.103 | 0.043 | — | 0.010 | 0 | 1.6 | 15.4 | 0.90 | $3.7 \times 10^2$ | 198 | 227 |
| Comparative Example 4A | 1.01 | 0.832 | 0.096 | 0.049 | 0.022 | 0.001 | 23.5 | 1.1 | 14.8 | 0.97 | $3.4 \times 10^2$ | 196 | 226 |

*When compressed at 4 g/cm³

Example 1B

[Crystallization Process]

A predetermined amount of pure water was put into the reaction tank (60 L), and the temperature inside the tank was set to 49° C. while stirring the water. At this time, $N_2$ gas was allowed to flow into the reaction tank so that the dissolved oxygen concentration in the reaction tank liquid was 0.8 mg/L. A 2.0 M mixed aqueous solution obtained by blending nickel sulfate, manganese sulfate, cobalt sulfate, and titanium sulfate so that the molar ratio among nickel:manganese:cobalt:titanium was 0.833:0.095:0.050:0.022, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 12.0 to 12.6, and the ammonia concentration was adjusted to 10 to 14 g/L. After the reaction tank was stabilized, a slurry containing nickel-manganese-cobalt-titanium composite hydroxide was collected through the overflow port and filtered to obtain a cake of nickel-manganese-cobalt-titanium composite hydroxide. Impurities were washed by allowing 1 L of pure water to pass through 140 g of nickel-manganese-cobalt-titanium composite hydroxide in the Denver used for filtration. The filtered powder was dried to obtain particles of nickel-manganese-cobalt-titanium composite hydroxide in which an amount of substance ratio of nickel, manganese, cobalt, and titanium is represented as Ni:Mn:Co:Ti=0.833:0.095:0.050:0.022.

[Mixture Preparation Process]

The obtained particles of nickel-manganese-cobalt-titanium composite hydroxide, lithium hydroxide, and niobic acid ($Nb_2O_5 \cdot 4H_2O$) were weighed so that the amount of substance ratio of lithium:(nickel+manganese+cobalt+titanium):niobium was 1.01:0.995:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was held and fired at 850° C. for 10 hours in an oxygen (oxygen concentration: 90% by volume) flow, and then was crushed to obtain particles of lithium-nickel-manganese-cobalt composite oxide (positive electrode active material).

[Evaluation]

The production conditions of the positive electrode active material is presented in Table 3, and results of evaluating the positive electrode active material thus obtained by the above evaluation method are presented in Table 4.

Example 2B

A positive electrode active material was obtained and evaluated in a similar manner to Example 1B, except that the firing temperature in the firing process was set to 870° C. The production conditions and evaluation results of the positive electrode active material are presented in Tables 3 and 4.

Example 3B

A positive electrode active material was obtained and evaluated in a similar manner to Example 1B, except that the firing temperature in the firing process was set to 890° C. The production conditions and evaluation results of the positive electrode active material are presented in Tables 3 and 4.

Example 4B

A positive electrode active material was obtained and evaluated in a similar manner to Example 2B, except that in the mixture preparation process, the obtained particles of nickel-manganese-cobalt-titanium composite hydroxide, lithium hydroxide, and niobic acid ($Nb_2O_5 \cdot 4H_2O$) were weighed so that the amount of substance ratio of lithium:(nickel+manganese+cobalt+titanium):niobium was 1.01:0.997:0.003. The production conditions and evaluation results of the positive electrode active material are presented in Tables 3 and 4.

Example 5B

A positive electrode active material was obtained and evaluated in a similar manner to Example 2B, except that in the mixture preparation process, niobium oxide ($Nb_2O_5$) was used as a niobium compound. The production conditions and evaluation results of the positive electrode active material are presented in Tables 3 and 4.

Example 6B

A positive electrode active material was obtained and evaluated in a similar manner to Example 2B, except that in the firing process, firing was performed in an oxygen (oxygen concentration: 60% by volume) flow. The production conditions and evaluation results of the positive electrode active material are presented in Tables 3 and 4.

Example 1C

[Crystallization Process]

Crystallization was performed in a similar manner to Example 1B, except that in the crystallization process, titanium sulfate was not contained in a 2.0 M mixed aqueous solution to be added into the reaction tank, and nickel sulfate, manganese sulfate, and cobalt sulfate were blended so that the molar ratio of nickel:manganese:cobalt was 0.85:0.10:0.05, so as to obtain a cake of the nickel-manganese-cobalt composite hydroxide obtained after filtration.

[Coating Process]

The obtained cake of the nickel-manganese-cobalt composite hydroxide was dispersed in pure water, the pH was adjusted to 8.2 using sulfuric acid, niobic acid dissolved in a potassium hydroxide solution was then added so that the molar ratio of nickel:manganese:cobalt:niobium was 0.847:0.098:0.050:0.005, and the nickel-manganese-cobalt composite hydroxide was coated with a niobium compound.

[Mixture Preparation Process]

A lithium mixture was obtained by mixing particles of the nickel-manganese-cobalt-niobium composite hydroxide thus obtained, lithium hydroxide, and titanium oxide ($TiO_2$) in a similar manner to Example 1B, except that they were weighed so that the amount of substance ratio of lithium:(nickel+manganese+cobalt+niobium):titanium was 1.01:0.978:0.022.

[Firing Process]

The firing was performed under the same conditions as in Example 2B to obtain and evaluate a positive electrode active material. The production conditions and evaluation results of the positive electrode active material are presented in Tables 3 and 4.

Example 2C

A positive electrode active material was obtained and evaluated in a similar manner to Example 1C, except that in the coating process, niobic acid dissolved in a potassium hydroxide solution was added so that the molar ratio of nickel:manganese:cobalt:niobium was 0.848:0.097:0.052:0.003. The production conditions and evaluation results of the positive electrode active material are presented in Tables 3 and 4.

Comparative Example 1B

A positive electrode active material was obtained and evaluated in a similar manner to Example 1B, except that a titanium sulfate aqueous solution in the crystallization process and a niobium compound in the mixture preparation process were not prepared, the obtained particles of nickel-manganese-cobalt composite hydroxide and lithium hydroxide were weighed so that the amount of substance ratio of lithium:nickel:manganese:cobalt was 1.01:0.85:0.10:0.05, and the firing temperature in the firing process was set to 800° C. The production conditions and evaluation results of the positive electrode active material are presented in Tables 3 and 4.

Comparative Example 2B

A positive electrode active material was obtained and evaluated in a similar manner to Example 1B, except that in the mixture preparation process, a niobium compound was not prepared, the obtained particles of nickel-manganese-cobalt-titanium composite hydroxide and lithium hydroxide were weighed so that the amount of substance ratio of lithium:(nickel+manganese+cobalt+titanium) was 1.01:1, and the firing temperature in the firing process was set to 830° C. The production conditions and evaluation results of the positive electrode active material are presented in Tables 3 and 4.

Comparative Example 3B

A positive electrode active material was obtained and evaluated in a similar manner to Example 1B, except that in the crystallization process, a titanium sulfate aqueous solution was not prepared, the obtained particles of nickel-manganese-cobalt composite hydroxide, lithium hydroxide, and niobic acid ($Nb_2O_5 \cdot 4H_2O$) were weighed so that the amount of substance ratio of lithium:(nickel+manganese+cobalt):niobium was 1.01:0.990:0.010, and the firing temperature in the firing process was set to 850° C. The production conditions and evaluation results of the positive electrode active material are presented in Tables 3 and 4.

Comparative Example 4B

A positive electrode active material was obtained and evaluated in a similar manner to Example 1B, except that in the mixture preparation process, the obtained particles of nickel-manganese-cobalt-titanium composite hydroxide, lithium hydroxide, and niobic acid ($Nb_2O_5 \cdot 4H_2O$) were weighed so that the amount of substance ratio of lithium:(nickel+manganese+cobalt+titanium):niobium was 1.01:0.999:0.001, and the firing temperature in the firing process was set to 840° C. The production conditions and evaluation results of the positive electrode active material are presented in Tables 3 and 4.

TABLE 3

| | Crystallization process | Coating process | | | Firing process | |
|---|---|---|---|---|---|---|
| | Use of titanium sulfate | Coating of niobium | Mixing process | | Oxygen concentration vol. % | Firing temperature ° C. |
| | | | Titanium compound | Niobium compound | | |
| Example 1B | Presence | Absence | — | $Nb_2O_5 \cdot 4H_2O$ | 90 | 850 |
| Example 2B | Presence | Absence | — | $Nb_2O_5 \cdot 4H_2O$ | 90 | 870 |
| Example 3B | Presence | Absence | — | $Nb_2O_5 \cdot 4H_2O$ | 90 | 890 |
| Example 4B | Presence | Absence | — | $Nb_2O_5 \cdot 4H_2O$ | 90 | 870 |
| Example 5B | Presence | Absence | — | $Nb_2O_5$ | 90 | 870 |
| Example 6B | Presence | Absence | — | $Nb_2O_5 \cdot 4H_2O$ | 60 | 870 |
| Example 1C | Absence | Presence | $TiO_2$ | — | 90 | 870 |
| Example 2C | Absence | Presence | $TiO_2$ | — | 90 | 870 |
| Comparative Example 1B | Absence | Absence | — | — | 90 | 800 |
| Comparative Example 2B | Presence | Absence | — | — | 90 | 830 |
| Comparative Example 3B | Absence | Absence | — | $Nb_2O_5 \cdot 4H_2O$ | 90 | 850 |
| Comparative Example 4B | Presence | Absence | — | $Nb_2O_5 \cdot 4H_2O$ | 90 | 840 |

TABLE 4

| | Positive electrode active material | | | | | | | | | | | Evaluation | |
|---|---|---|---|---|---|---|---|---|---|---|---|---|---|
| | Amount of substance ratio | | | | | | Ti/Nb amount of substance ratio | Grain boundary/ intraparticle Nb concentration | Volume average particle size MV μm | Particle size distri- bution width | Volume resis- tivity* Ω·cm | Dis- charge capacity mAh/g | Maximum oxygen generation peak temperature ° C. |
| | Li a | Ni 1 - x - y - x - w | Mn X | Co(M) y | Ti z | Nb w | | | | | | | |
| Example 1B | 1.01 | 0.828 | 0.095 | 0.050 | 0.022 | 0.005 | 4.4 | 1.6 | 14.3 | 0.95 | $3.1 \times 10^3$ | 185 | 265 |
| Example 2B | 1.01 | 0.828 | 0.095 | 0.050 | 0.022 | 0.005 | 4.4 | 1.6 | 14.7 | 0.96 | $3.6 \times 10^3$ | 192 | 266 |
| Example 3B | 1.01 | 0.828 | 0.095 | 0.050 | 0.022 | 0.005 | 4.4 | 1.6 | 14.8 | 0.95 | $3.8 \times 10^3$ | 192 | 270 |
| Example 4B | 1.01 | 0.829 | 0.096 | 0.050 | 0.022 | 0.003 | 7.3 | 1.5 | 14.4 | 0.95 | $1.3 \times 10^3$ | 198 | 255 |
| Example 5B | 1.01 | 0.829 | 0.096 | 0.049 | 0.022 | 0.004 | 5.5 | 1.7 | 15.3 | 0.97 | $3.2 \times 10^3$ | 189 | 259 |
| Example 6B | 1.01 | 0.827 | 0.096 | 0.050 | 0.022 | 0.005 | 4.4 | 1.7 | 15.8 | 0.97 | $2.5 \times 10^3$ | 168 | 265 |
| Example 1C | 1.01 | 0.828 | 0.096 | 0.049 | 0.022 | 0.005 | 4.4 | 1.7 | 14.9 | 0.97 | $3.4 \times 10^3$ | 193 | 264 |
| Example 2C | 1.01 | 0.829 | 0.095 | 0.051 | 0.022 | 0.003 | 7.3 | 1.5 | 14.3 | 0.96 | $1.7 \times 10^3$ | 197 | 257 |
| Comparative Example 1B | 1.01 | 0.850 | 0.100 | 0.050 | — | — | — | — | 14.0 | 0.88 | $9.2 \times 10$ | 210 | 216 |
| Comparative Example 2B | 1.01 | 0.829 | 0.096 | 0.049 | 0.026 | — | — | — | 14.8 | 0.89 | $1.4 \times 10^2$ | 193 | 225 |
| Comparative Example 3B | 1.01 | 0.843 | 0.100 | 0.047 | — | 0.010 | 0 | 1.5 | 15.3 | 0.96 | $3.9 \times 10^2$ | 197 | 226 |
| Comparative Example 4B | 1.01 | 0.830 | 0.097 | 0.050 | 0.022 | 0.001 | 24.6 | 1.1 | 14.4 | 0.95 | $2.7 \times 10^2$ | 196 | 227 |

*When compressed at 4 g/cm³

(Evaluation Result 1)

As shown in Tables 1 to 4 and FIGS. 1 and 2, it is clear that the positive electrode active materials obtained in Examples have a volume resistivity when compressed of $5 \times 10^2$ Ω·cm or more and a maximum oxygen generation peak temperature of 250° C. or higher, high thermal stability is attained, and oxygen releasing at the time of overcharge is suppressed.

Furthermore, as shown in Tables 1 to 4 and FIG. 3, in Examples 1A to 5A, 1B to 5B, 1C, and 2C in which firing was performed in an atmosphere having an oxygen concentration of 80 vol %, a positive electrode active material having a high discharge capacity of 184 mAh/g or more, high thermal stability, and a high battery capacity was obtained.

Figures 17A, 17B, 17C:
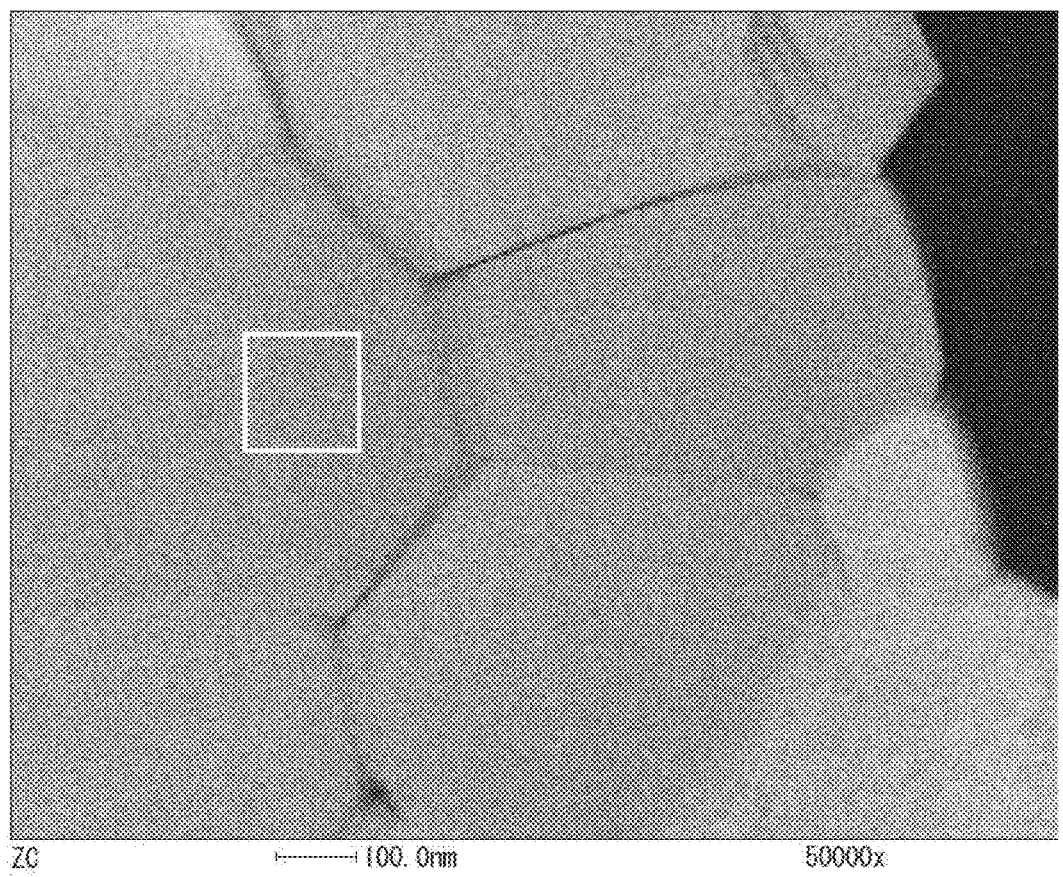
FIG. 17(A) is a diagram illustrating an example of a cross-sectional photograph of a positive electrode active material.
FIG. 17(B) and FIG. 17(C) are diagrams each illustrating an example of evaluation results of STEM-EDX inside primary particles of positive electrode active materials of Example 2A and Example 2B.
Figures 18A, 18B, 18C:
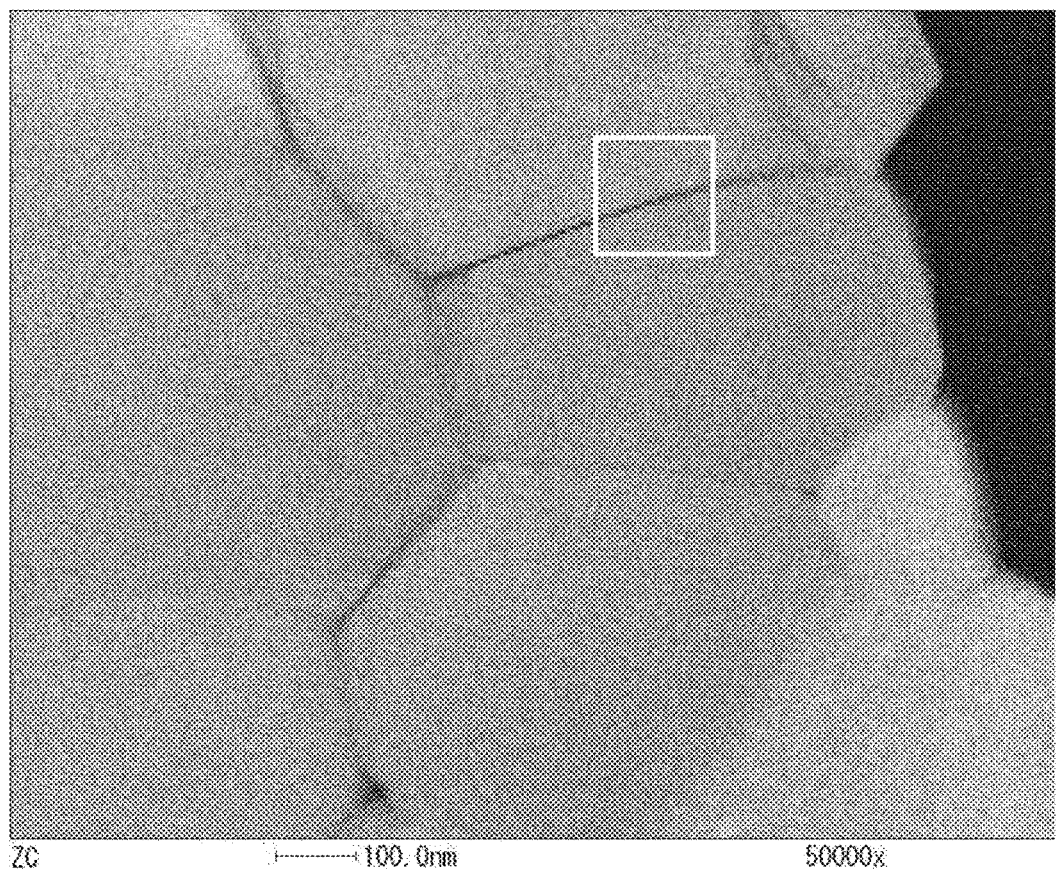
FIG. 18(A) is a diagram illustrating an example of a cross-sectional photograph of a positive electrode active material.
FIG. 18(B) and FIG. 18(C) are diagrams each illustrating an example of evaluation results of STEM-EDX at a grain boundary between primary particles of positive electrode active materials of Example 2A and Example 2B.

FIG. 17(A) and FIG. 18(A) are diagrams showing cross-sectional photographs of a positive electrode active material, a part surrounded by a quadrilateral in these diagrams shows an example of a place used in analysis, and the concentration (atomic %) of each element in the part surrounded by a quadrilateral was analyzed by point analysis using STEM-EDX. FIG. 17(B), FIG. 17(C), FIG. 18(B), and FIG. 18(C) are diagrams illustrating an example of results of evaluation of the composition inside primary particles (FIG. 17(B): Example 2A, FIG. 17(C): Example 2B) and at a grain boundary between primary particles (FIG. 18(B): Example 2B, FIG. 18(B): Example 2B) in cross-sections of positive electrode active materials of Examples 2A and 2B by point analysis using STEM-EDX.

As illustrated in FIG. 17(B), FIG. 17(C), FIG. 18(B), and FIG. 18(C), in the positive electrode active materials obtained in Examples, niobium was segregated to a grain boundary between primary particles. Further, as presented in Tables 2 and 4, the niobium concentration at the grain boundary between primary particles to the niobium concentration inside primary particles (grain boundary niobium concentration/intraparticle niobium concentration) was 1.3 times or more. Furthermore, the segregation of titanium at the grain boundary between primary particles was not recognized, the titanium concentration at the grain boundary between primary particles to the titanium concentration inside primary particles (titanium concentration at the grain boundary/titanium concentration in particles) was less than 1.3 times (specifically, 0.8 times or more and 1.1 times or less).

On the other hand, since the positive electrode active materials of Comparative Examples 1A and 1B did not contain titanium and niobium, the volume resistivity when compressed and the maximum oxygen generation peak temperature was low, and thermal stability was not sufficient.

Furthermore, since the positive electrode active materials of Comparative Examples 2A, 3A, 2B, and 3B contain only one of titanium and niobium, the maximum oxygen generation peak temperature and the volume resistivity at the time of compression are slightly higher than those of Comparative Example 1 but are lower than Examples, and it cannot be said that thermal stability during short circuit is sufficient.

Furthermore, in the positive electrode active materials of Comparative Examples 4A and 4B, since the content of niobium is 0.001 or less, the volume resistivity when compressed and the maximum oxygen generation peak temperature were low, and thermal stability was not sufficient.

Hereinafter, Example 11A to Example 11C in which the water-washing process and the drying process were performed will be described.

Example 11A

Water was mixed at a ratio of 100 parts by mass with respect to 150 parts by mass of the lithium-nickel-manganese-cobalt-titanium composite oxide obtained under the same conditions as in Example 2A, and was stirred with water and then suction-filtered using a Nutsche so as to obtain a precipitate (water-washing process). The obtained precipitate was put in a SUS container, heated to 100° C. for 12 hours and heated to 190° C. for 10 hours using a vacuum dryer, and left to stand and dried so as to obtain a positive electrode active material (drying process). The production conditions and evaluation results of the positive electrode active material are presented in Table 5 to Table 7. Note that, in Tables 5 to 7, as reference, the production conditions and evaluation results of the positive electrode active materials of Example 2A and Comparative Examples 1A to 4A are collectively presented.

TABLE 5

| | Mixing process | | Firing process | | Water-washing process | |
|---|---|---|---|---|---|---|
| | Titanium compound | Niobium compound | Oxygen concentration vol. % | Firing temperature °C. | Presence/absence of water washing | Mixing amount of water g/150 g |
| Example 11A | TiO$_2$ | Nb$_2$O$_5$·4H$_2$O | 90 | 870 | Presence | 100 |
| Example 2A | TiO$_2$ | Nb$_2$O$_5$·4H$_2$O | 90 | 870 | Absence | — |
| Comparative Example 1A | — | — | 90 | 800 | Absence | — |
| Comparative Example 2A | TiO$_2$ | — | 90 | 830 | Absence | — |
| Comparative Example 3A | — | Nb$_2$O$_5$·4H$_2$O | 90 | 850 | Absence | — |
| Comparative Example 4A | TiO$_2$ | Nb$_2$O$_5$·4H$_2$O | 90 | 840 | Absence | — |

TABLE 6

| | Positive electrode active material physical property | | | | | | | | | | Evaluation | |
|---|---|---|---|---|---|---|---|---|---|---|---|---|
| | Amount of substance ratio | | | | | | Ti/Nb amount of substance ratio | Grain boundary/intraparticle Nb concentration | Volume average particle size MV μm | Particle size distribution width | Discharge capacity mAh/g | Maximum oxygen generation peak temperature °C. |
| | Li a | Ni 1-x-y-x-w | Mn x | Co(M) y | Ti z | Nb w | | | | | | |
| Example 11A | 0.99 | 0.826 | 0.097 | 0.049 | 0.022 | 0.005 | 4.7 | 1.5 | 14.8 | 0.96 | 198 | 253 |
| Example 2A | 1.01 | 0.828 | 0.096 | 0.050 | 0.022 | 0.005 | 4.6 | 1.6 | 14.2 | 0.96 | 191 | 264 |
| Comparative Example 1A | 1.02 | 0.852 | 0.098 | 0.050 | 0 | 0 | — | — | 13.9 | 0.87 | 211 | 217 |
| Comparative Example 2A | 1.02 | 0.830 | 0.096 | 0.048 | 0.026 | 0 | — | — | 15.6 | 0.87 | 191 | 227 |
| Comparative Example 3 A | 1.00 | 0.844 | 0.103 | 0.043 | 0 | 0.010 | — | 1.6 | 15.4 | 0.90 | 198 | 227 |
| Comparative Example 4A | 1.01 | 0.832 | 0.096 | 0.049 | 0.022 | 0.001 | 23.5 | 1.1 | 14.8 | 0.97 | 196 | 226 |

TABLE 7

| | Eluted lithium amount wt. % |
|---|---|
| Example 11A | 0.05 |
| Example 2A | 0.21 |

Example 7B

[Crystallization Process]

A predetermined amount of pure water was put into the reaction tank (60 L), and the temperature inside the tank was set to 49° C. while stirring the water. At this time, N$_2$ gas was allowed to flow into the reaction tank so that the dissolved oxygen concentration in the reaction tank liquid was 0.8 mg/L. A 2.0 M mixed aqueous solution of nickel sulfate, manganese sulfate, cobalt sulfate, and titanium sulfate so that the molar ratio among nickel:manganese:cobalt:titanium was 0.829:0.098:0.050:0.023, a 25% by mass sodium hydroxide solution as an alkaline solution, and 25% by mass of ammonia water as a complexing agent were continuously added into this reaction tank at the same time, and crystallization by a continuous crystallization method was performed.

At the time, the flow rate was controlled so that the residence time of the mixed aqueous solution was 8 hours, the pH in the reaction tank was adjusted to 12.0 to 12.6, and the ammonia concentration was adjusted to 10 to 14 g/L. After the reaction tank was stabilized, a slurry containing nickel-manganese-cobalt-titanium composite hydroxide was collected through the overflow port and filtered to obtain a cake of nickel-manganese-cobalt-titanium composite hydroxide. Impurities were washed by allowing 1 L of pure water to pass through 140 g of nickel-manganese-cobalt-titanium composite hydroxide in the Denver used for filtration. The filtered powder was dried to obtain particles of nickel-manganese-cobalt-titanium composite hydroxide containing titanium in which an amount of substance ratio of nickel, manganese, cobalt, and titanium is represented as Ni:Mn:Co:Ti=0.829:0.098:0.050:0.023.

[Mixture Preparation Process]

The obtained particles of nickel-manganese-cobalt-titanium composite hydroxide containing titanium, lithium hydroxide, and niobic acid (Nb$_2$O$_5$·4H$_2$O) were weighed so that the amount of substance ratio of lithium:(nickel+manganese+cobalt+titanium):niobium was 1.01:0.995:0.005, and then thoroughly mixed together using a shaker mixer device (TURBULA Type T2C manufactured by Willy A. Bachofen (WAB) AG) to obtain a lithium mixture.

[Firing Process]

The obtained lithium mixture was held and fired at 870° C. for 10 hours in an oxygen (oxygen concentration: 90% by volume) flow, and then was crushed to obtain particles of lithium-nickel-manganese-cobalt composite oxide (positive electrode active material).

[Evaluation]

The production conditions of the positive electrode active material is presented in Table 8 and evaluation results of the positive electrode active material thus obtained are presented in Tables 9 and 10. Furthermore, the volume resistivity when the obtained positive electrode active material was compressed at 4.0 g/cm$^3$ was 3.5×10$^3$ (Ω·cm).

Example 11B

Water was mixed at a ratio of 100 parts by mass with respect to 150 parts by mass of the lithium-nickel-manganese-cobalt-titanium composite oxide obtained under the same conditions as in Example 7B, and was stirred with water and then suction-filtered using a Nutsche so as to obtain a precipitate (water-washing process). The obtained precipitate was put in a SUS container, heated to 100° C. for 12 hours and heated to 190° C. for 10 hours using a vacuum dryer, and left to stand still and dried so as to obtain a positive electrode active material (drying process). The production conditions and evaluation results of the positive electrode active material are presented in Tables 8 to Table 10.

Example 11C

[Crystallization Process]

The crystallization process was performed in a similar manner to Example 11B, except that in the crystallization process, titanium sulfate was not contained in a 2.0 M mixed aqueous solution to be added into the reaction tank, and nickel sulfate, manganese sulfate, and cobalt sulfate were blended so that the molar ratio of nickel:manganese:cobalt was 0.85:0.10:0.05, so as to obtain a cake of the nickel-manganese-cobalt composite hydroxide obtained after filtration.

[Coating Process]

The obtained cake of the nickel-manganese-cobalt composite hydroxide was dispersed in pure water, the pH was adjusted to 8.2 using sulfuric acid, niobic acid dissolved in a potassium hydroxide solution was then added so that the molar ratio of nickel:manganese:cobalt:niobium was 0.845:0.100:0.050:0.005, and the nickel-manganese-cobalt composite hydroxide was coated with a niobium compound.

[Mixture Preparation Process]

A lithium mixture was obtained by mixing particles of the nickel-manganese-cobalt-niobium composite hydroxide thus obtained, lithium hydroxide, and titanium oxide (TiO$_2$) in a similar manner to Example 11B, except that they were weighed so that the amount of substance ratio of lithium:(nickel+manganese+cobalt+niobium):titanium was 1.01:0.978:0.022.

[Firing Process]

The firing, water-washing, and drying were performed under the same conditions as in Example 11B to obtain and evaluate a positive electrode active material. The production conditions and evaluation results of the positive electrode active material are presented in Tables 8 to 10.

Comparative Example 5B

A positive electrode active material was obtained and evaluated in a similar manner to Example 7B, except that a titanium sulfate aqueous solution in the crystallization process and a niobium compound in the mixture preparation process were not prepared, the obtained particles of nickel-manganese-cobalt composite hydroxide and lithium hydroxide were weighed so that the amount of substance ratio of lithium:nickel:manganese:cobalt was 1.02:0.85:0.10:0.05, and the firing temperature in the firing process was set to 800° C. The volume resistivity when the obtained positive electrode active material was compressed to 4.0 g/cm$^3$ was 8.5×10$^1$ Ω·cm. The production conditions and evaluation results of the positive electrode active material are presented in Tables 8 and 9.

Comparative Example 6B

A positive electrode active material was obtained and evaluated in a similar manner to Example 7B, except that in the mixture preparation process, a niobium compound was not prepared, the obtained particles of nickel-manganese-cobalt composite hydroxide containing titanium and lithium hydroxide were weighed so that the amount of substance ratio of lithium:(nickel+manganese+cobalt+titanium) was 1.02:1, and the firing temperature in the firing process was set to 830° C. The volume resistivity when the obtained positive electrode active material was compressed to 4.0 g/cm$^3$ was 2.1×10$^2$ Ω·cm. The production conditions and evaluation results of the positive electrode active material are presented in Tables 8 and 9.

Comparative Example 7B

A positive electrode active material was obtained and evaluated in a similar manner to Example 7B, except that in the crystallization process, a titanium sulfate aqueous solution was not prepared, the obtained particles of nickel-manganese-cobalt composite hydroxide, lithium hydroxide, and niobic acid (Nb$_2$O$_5$·4H$_2$O) were weighed so that the amount of substance ratio of lithium:(nickel+manganese+cobalt):niobium was 1.01:0.991:0.009, and the firing temperature in the firing process was set to 850° C. The volume resistivity when the obtained positive electrode active material was compressed to 4.0 g/cm$^3$ was 3.4×10$^2$ Ω·cm. The production conditions and evaluation results of the positive electrode active material are presented in Tables 8 and 9.

Comparative Example 8B

A positive electrode active material was obtained and evaluated in a similar manner to Example 7B, except that in the mixture preparation process, the obtained particles of nickel-manganese-cobalt composite hydroxide containing titanium, lithium hydroxide, and niobic acid (Nb$_2$O$_5$·4H$_2$O) were weighed so that the amount of substance ratio of lithium:(nickel+manganese+cobalt+titanium):niobium was 1.01:0.999:0.001, and the firing temperature in the firing process was set to 840° C. The volume resistivity when the obtained positive electrode active material was compressed to 4.0 g/cm$^3$ was 3.3×10$^2$ Ω·cm. The production conditions and evaluation results of the positive electrode active material are presented in Tables 8 and 9.

TABLE 8

|  | Crystallization process | Coating process | Mixing process | | Firing process | | Water-washing process | |
|---|---|---|---|---|---|---|---|---|
|  | Use of titanium sulfate | Coating of niobium | Titanium compound | Niobium compound | Oxygen concentration vol. % | Firing temperature ° C. | Presence/ absence of water washing | Mixing amount of water g/150 g |
|  | — | — | — | — |  |  | — |  |
| Example 11B | Presence | Absence | — | Nb$_2$O$_5$•4H$_2$O | 90 | 870 | Presence | 100 |
| Example 11C | Absence | Presence | TiO$_2$ | — | 90 | 870 | Presence | 100 |
| Example 7B | Presence | Absence | — | Nb$_2$O$_5$•4H$_2$O | 90 | 870 | Absence | — |
| Comparative Example 5B | Absence | Absence | — | — | 90 | 800 | Absence | — |
| Comparative Example 6B | Presence | Absence | — | — | 90 | 830 | Absence | — |
| Comparative Example 7B | Absence | Absence | — | Nb$_2$O$_5$•4H$_2$O | 90 | 850 | Absence | — |
| Comparative Example SB | Presence | Absence | — | Nb$_2$O$_5$•4H$_2$O | 90 | 840 | Absence | — |

TABLE 9

| | Positive electrode active material physical property | | | | | | | | | Evaluation | |
|---|---|---|---|---|---|---|---|---|---|---|---|
| | Amount of substance ratio | | | | | | Ti/Nb amount of substance ratio | Grain boundary/ intraparticle Nb concentration | Volume average particle size MV μm | Particle size distribution width | Discharge capacity mAh/g | Maximum oxygen generation peak temperature ° C. |
| | Li a | Ni 1 - x - y - x - w | Mn X | Co(M) y | Ti z | Nb w | — | — | | — | | |
| Example 11B | 0.99 | 0.825 | 0.097 | 0.050 | 0.023 | 0.005 | 4.9 | 1.7 | 14.7 | 0.97 | 199 | 255 |
| Example 11C | 0.99 | 0.825 | 0.098 | 0.049 | 0.023 | 0.005 | 4.9 | 1.8 | 14.5 | 0.98 | 198 | 253 |
| Example 7B | 1.01 | 0.826 | 0.096 | 0.050 | 0.023 | 0.005 | 4.8 | 1.8 | 14.8 | 0.96 | 190 | 265 |
| Comparative Example 5B | 1.02 | 0.850 | 0.100 | 0.050 | 0 | 0 | — | — | 14.0 | 0.89 | 210 | 216 |
| Comparative Example 6B | 1.02 | 0.830 | 0.096 | 0.048 | 0.026 | 0 | — | — | 14.9 | 0.95 | 191 | 227 |
| Comparative Example 7B | 1.01 | 0.845 | 0.102 | 0.043 | 0 | 0.009 | — | 1.7 | 15.1 | 0.98 | 197 | 226 |
| Comparative Example SB | 1.01 | 0.831 | 0.096 | 0.049 | 0.023 | 0.001 | 24.2 | 1.1 | 14.7 | 0.95 | 195 | 227 |

TABLE 10

| | Eluted lithium amount wt. % |
|---|---|
| Example 11B | 0.05 |
| Example 11C | 0.04 |
| Example 7B | 0.23 |

(Evaluation Result 2)

As shown in Tables 6 and 9 and FIG. 4, it is clear that the positive electrode active materials obtained in Examples 11A to 11C have a maximum oxygen generation peak temperature of 250° C. or higher and a high thermal stability, and oxygen releasing at the time of overcharge is suppressed.

Furthermore, as shown in Tables 6 and 9 and FIG. 5, in Examples 11A and 11B in which water-washing and drying were performed, as compared with Example 2A and Example 7B in which water-washing and drying were not performed, a positive electrode active material having a high discharge capacity, a high thermal stability, and a higher battery capacity was obtained.

Furthermore, as shown in Tables 7 and 10, it was shown that in Example 2A and Example 7B in which water-washing and drying were not performed, the eluted lithium amount exceeds 0.20% by mass, but in Examples 11A, 11B, and 11C, the eluted lithium amount is 0.20% by mass or less and the excessive lithium is decreased.

On the other hand, since the positive electrode active materials of Comparative Examples 1A and 5B did not contain titanium and niobium, the maximum oxygen generation peak temperature was low, and thermal stability was not sufficient.

Furthermore, in the positive electrode active materials of Comparative Examples 4A and 8B, since the content of niobium is 0.001 or less, the maximum oxygen generation peak temperature was low, and thermal stability was not sufficient.

INDUSTRIAL APPLICABILITY

In the present embodiment, a positive electrode active material for a lithium ion secondary battery having high thermal stability and excellent battery characteristics can be obtained by an industrial production method. This lithium ion secondary battery is suitable for a power source of a small portable electronic device (such as a notebook personal computer or a mobile phone terminal) that is required to have a high capacity all the time.

Furthermore, the secondary battery using the positive electrode active material according to the present embodiment is excellent in thermal stability and further excellent in capacity also in comparison with a battery using a conventional positive electrode active material of a lithium-nickel-based oxide. Hence, the secondary battery is suitably used as a power source for electric cars that are restricted in a mounting space since miniaturization thereof is possible.

Furthermore, the secondary battery using the positive electrode active material according to the present embodiment can be used not only as a power source for electric cars driven purely by electric energy but also as a power source and a stationary storage battery for so-called hybrid cars used together with a combustion engine such as a gasoline engine or a diesel engine.

Note that, the technical scope of the present invention is not limited to the aspects described in the above embodiment and the like. One or more of the requirements described in the above embodiment and the like may be omitted. Furthermore, the requirements described in the above embodiment and the like can be combined as appropriate. In addition, to the extent permitted by law, the disclosure of Japanese Patent Application Nos. 2019-127259, 2019-236895, 2020-092692, 2019-127258, 2019-236896, and 2020-092693, which are Japanese patent applications, and all the literatures cited in this specification is incorporated as part of the description of the text.

REFERENCE SIGNS LIST

CBA Coin-type battery (for evaluation)
PE Positive electrode (electrode for evaluation)
NE Negative electrode
SE Separator
GA Gasket
WW Wave washer
PC Positive electrode can
NC Negative electrode can
G Void

The invention claimed is:

1. A method for producing a positive electrode active material for a lithium ion secondary battery which contains a lithium-nickel-manganese composite oxide having a hexagonal layered structure and configured by secondary particles with a plurality of aggregated primary particles, the method comprising:

a mixture preparation process of preparing a mixture containing at least a nickel-manganese composite compound, a lithium compound, and optionally one or both of a titanium compound and a niobium compound; and a firing process of firing the mixture at 750° C. or higher and 1000° C. or lower so as to obtain the lithium-nickel-manganese composite oxide, wherein the nickel-manganese composite compound contains nickel (Ni), manganese (Mn), optionally an element M (M) that is at least one element selected from the group consisting of Co, V, Mg, Mo, Ca, Cr, Ta, Na, W, Fe, Zn, B, Si, P, Zr, and Al, titanium (Ti), and niobium (Nb), and an amount of substance ratio of the respective elements is represented as Ni:Mn:M:Ti:Nb=(1−x−y):x:y:z':w', wherein $0.03 \leq x \leq 0.30$, $0 \leq y \leq 0.30$, $0 \leq z' \leq 0.05$, and $0 \leq w' < 0.02$, an amount of substance ratio (z) of titanium and an amount of substance ratio (w) of niobium to a total amount of substance of nickel, manganese, the element M, titanium, and niobium in the mixture satisfy $0.005 \leq z \leq 0.05$, $0.001 < w < 0.02$, $(z+w) \leq 0.06$, and $z > w$, and at least a part of the niobium in the lithium-nickel-manganese composite oxide is segregated to a grain boundary between primary particles, a niobium concentration at the grain boundary between the primary particles, as determined by point analysis using STEM-EDX, with respect to a niobium concentration inside the primary particles of the lithium-nickel composite oxide is 1.3 times or more, the titanium is solid-solved inside the primary particles of the lithium-nickel composite oxide, and a titanium concentration at the grain boundary between the primary particles, as determined by the point analysis using STEM-EDX, with respect to a titanium concentration inside the primary particles of the lithium-nickel composite oxide is less than 1.3 times.

2. A method for producing a positive electrode active material for a lithium ion secondary battery which contains a lithium-nickel-manganese composite oxide having a hexagonal layered structure and configured by secondary particles with a plurality of aggregated primary particles, the method comprising:

a mixture preparation process of preparing a mixture by mixing at least a nickel-manganese composite compound, a titanium compound, a niobium compound, and a lithium compound; and a firing process of firing the mixture at 750° C. or higher and 1000° C. or lower so as to obtain the lithium-nickel-manganese composite oxide, wherein the nickel-manganese composite compound contains nickel (Ni), manganese (Mn), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements is represented as Ni:Mn:M=(1−x−y):x:y, wherein $0.03 \leq x \leq 0.30$ and $0 \leq y \leq 0.30$, an amount of substance ratio (z) of titanium and an amount of substance ratio (w) of niobium to a total amount of substance of nickel, manganese, the element M, titanium, and niobium in the mixture satisfy $0.005 \leq z \leq 0.05$, $0.001 < w < 0.02$, $(z+w) \leq 0.06$, and $z > w$, and at least a part of the niobium in the lithium-nickel-manganese composite oxide is segregated to a grain boundary between primary particles, a niobium concentration at the grain boundary between the primary particles, as determined by point analysis using STEM-EDX, with respect to a niobium concentration inside the primary particles of the lithium-nickel composite oxide is 1.3 times or more, the titanium is solid-solved inside the primary particles of the lithium-nickel composite oxide, and a titanium concentration at the grain boundary between the primary particles, as determined by the point analysis using STEM-EDX, with respect to a titanium concentration inside the primary particles of the lithium-nickel composite oxide is less than 1.3 times.

3. The method for producing a positive electrode active material for a lithium ion secondary battery according to claim 1, comprising:

a water-washing process of mixing and stirring water at a ratio of 50 parts by weight or more and 200 parts by weight or less with respect to 150 parts by weight of the lithium-nickel-manganese composite oxide obtained after firing and then performing solid-liquid separation; and a drying process of drying the lithium-nickel-manganese composite oxide obtained after water-washing.

4. The method for producing a positive electrode active material for a lithium ion secondary battery according to claim 1, wherein the amount of substance ratio (z) of titanium and the amount of substance ratio (w) of niobium to a total amount of substance of nickel, manganese, the element M, titanium, and niobium in the mixture satisfy $0.005 \leq z \leq 0.05$, $0.002 \leq w < 0.02$, $(z+w) \leq 0.06$, and $z > w$.

5. The method for producing a positive electrode active material for a lithium ion secondary battery according to claim 1, wherein in the mixture preparation process, at least a nickel-manganese composite compound containing titanium, a niobium compound, and a lithium compound are mixed, the nickel-manganese composite compound containing titanium contains nickel (Ni), manganese (Mn), titanium (Ti), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements is represented as Ni:Mn:M:Ti= $(1-x-y-z')$:x:y:z', wherein $0.03 \leq x \leq 0.30$, $0 \leq y \leq 0.30$, and $0.005 \leq z' \leq 0.05$.

6. The method for producing a positive electrode active material for a lithium ion secondary battery according to claim 5, wherein the nickel-manganese composite compound containing titanium is obtained by crystallization.

7. The method for producing a positive electrode active material for a lithium ion secondary battery according to claim 5, wherein the nickel-manganese composite compound containing titanium is obtained by coating the nickel-manganese composite compound obtained by crystallization.

8. The method for producing a positive electrode active material for a lithium ion secondary battery according to claim 1, wherein in the mixture preparation process, at least a nickel-manganese composite compound containing niobium, a lithium compound, and a titanium compound are mixed, the nickel-manganese composite compound containing niobium contains nickel (Ni), manganese (Mn), niobium (Nb), and optionally an element M (M) that is at least one element selected from the group consisting of Co, V, Mg, Mo, Ca, Cr, Ta, Na, W, Fe, Zn, B, Si, P, Zr, and Al, and an amount of substance ratio of the respective elements is represented as Ni:Mn:M:Nb= $(1-x-y)$:x:y:w', wherein $0.03 \leq x \leq 0.30$, $0 \leq y \leq 0.30$, and $0.001 < w' < 0.02$.

9. The method for producing a positive electrode active material for a lithium ion secondary battery according to claim 8, wherein the nickel-manganese composite compound containing niobium is obtained by coating the nickel-manganese composite compound obtained by crystallization.

10. The method for producing a positive electrode active material for a lithium ion secondary battery according to claim 8, wherein an amount of substance ratio of the elements in the nickel-manganese composite compound containing niobium is represented as Ni:Mn:M:Nb= $(1-x-y)$:x:y:w', wherein $0.03 \leq x \leq 0.30$, $0 \leq y \leq 0.30$, and $0.002 \leq w' < 0.02$.

11. The method for producing a positive electrode active material for a lithium ion secondary battery according to claim 1, wherein the firing process is performed in an atmosphere having an oxygen concentration of 80 vol % or more and 100 vol % or less.

12. The method for producing a positive electrode active material for a lithium ion secondary battery according to claim 1, wherein titanium in the lithium-nickel-manganese composite oxide exists inside the primary particles.

13. The method for producing a positive electrode active material for a lithium ion secondary battery according to claim 1, wherein the titanium compound is titanium oxide.

14. The method for producing a positive electrode active material for a lithium ion secondary battery according to claim 1, wherein the niobium compound is niobium oxide, niobic acid, or a mixture thereof.

15. The method for producing a positive electrode active material for a lithium ion secondary battery according to claim 1, wherein a volume resistivity, as determined by powder resistivity measurement, when the lithium-nickel-manganese composite oxide obtained after firing is compressed to 4.0 g/cm$^3$ is $5.0 \times 10^2$ Ω·cm or more and $1.0 \times 10^5$ Ω·cm or less.

16. The method for producing a positive electrode active material for a lithium ion secondary battery according to claim 1, wherein the amount of substance ratio of Nb in the nickel-manganese composite compound satisfies $0 \leq w' \leq 0.01$, and the amount of substance ratio of niobium in the mixture satisfies $0.001 < w \leq 0.01$.

17. The method for producing a positive electrode active material for a lithium ion secondary battery according to claim 2, wherein the amount of substance ratio of niobium in the mixture satisfies $0.001 < w \leq 0.01$.

* * * * *